(12) United States Patent
Nishi et al.

(10) Patent No.: US 8,062,740 B2
(45) Date of Patent: Nov. 22, 2011

(54) POLYAMIDE BASED MIXED RESIN FILM ROLL AND PROCESS FOR PRODUCING THE SAME

(75) Inventors: Tadashi Nishi, Inuyama (JP); Yoshinori Miyaguchi, Inuyama (JP); Naonobu Oda, Inuyama (JP); Katsuhiko Nose, Osaka (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 462 days.

(21) Appl. No.: 11/887,101

(22) PCT Filed: Dec. 21, 2005

(86) PCT No.: PCT/JP2005/023511
§ 371 (c)(1),
(2), (4) Date: Dec. 7, 2007

(87) PCT Pub. No.: WO2006/112090
PCT Pub. Date: Oct. 26, 2006

(65) Prior Publication Data
US 2008/0254259 A1    Oct. 16, 2008

(30) Foreign Application Priority Data

| Apr. 1, 2005 | (JP) | 2005-106660 |
| May 27, 2005 | (JP) | 2005-156234 |
| Jul. 12, 2005 | (JP) | 2005-203302 |

(51) Int. Cl.
*B32B 27/34* (2006.01)
*B32B 5/16* (2006.01)
*B29C 47/88* (2006.01)

(52) U.S. Cl. .... 428/220; 428/143; 428/149; 264/211.12

(58) Field of Classification Search .................. 428/143, 428/149, 220; 264/211.12
See application file for complete search history.

(56) References Cited

U.S. PATENT DOCUMENTS

| 4,098,860 | A | | 7/1978 | Etou et al. |
| 5,130,383 | A | * | 7/1992 | Yoshino et al. ............... 525/423 |
| 5,718,965 | A | | 2/1998 | Shiroeda et al. |
| 6,319,986 | B1 | * | 11/2001 | Amimoto et al. ............... 525/66 |
| 6,376,093 | B1 | * | 4/2002 | Fujita et al. ............... 428/474.4 |
| 2006/0058424 | A1 | * | 3/2006 | Suzuki et al. ............... 523/200 |

FOREIGN PATENT DOCUMENTS

| EP | 0 719 631 A2 | | 7/1996 |
| EP | 927624 A2 | * | 7/1999 |
| EP | 1754588 A1 | | 2/2007 |
| EP | 1897687 A1 | | 3/2008 |
| JP | 3-253322 A | | 11/1991 |
| JP | 08-174663 A | | 7/1996 |
| JP | 8-199064 A | | 8/1996 |
| JP | 08-267569 A | | 10/1996 |
| JP | 10-016047 A | | 1/1998 |
| JP | 10-100226 A | | 4/1998 |
| JP | 10-296853 A | | 11/1998 |
| JP | 11-060944 A | | 3/1999 |
| JP | 11-71528 A | | 3/1999 |
| JP | 2000-309074 A | | 11/2000 |
| JP | 2002-029014 A | | 1/2002 |
| JP | 2004-181777 A | | 7/2004 |
| JP | 2004181777 A | * | 7/2004 |
| JP | 2004-352796 A | | 12/2004 |
| WO | WO 2004016693 A1 | * | 2/2004 |

OTHER PUBLICATIONS

Machine_English_Translation_of_JP_2004_181777_A, Oda et. al., "Polyamide Based Film Roll and Its Manufacturing Method", Jul. 2, 2004, JPO, pp. 1-13.*
Machine_English_Translation_JP_2004/181777_A, Oda et.al., Polyamide Based Film Roll and its Manufacturing Method, JPO, Jul. 2, 2004, pp. 1-15.*
European Patent Office, Supplemental European Search Report in related European Patent Application No. 05820355.5, dated Jan. 7, 2010.
Japan Patent Office, Notification of Reasons for Refusal, dated Aug. 23, 2011, in related Japanese Patent Application No. JP2007-107355.
Motohiro Tsuruta, Plastic Material Seminar 9, Polyamide Resin, 2nd Ed. (Mar. 15, 1963), p. 159, published by Nikkan Kogyo Shimbun Ltd., Japan.

* cited by examiner

*Primary Examiner* — David Sample
*Assistant Examiner* — Tahseen N Khan
(74) *Attorney, Agent, or Firm* — Kenyon & Kenyon LLP

(57) ABSTRACT

The problem to be solved by the present invention is to provide a biaxially oriented polyamide based mixed resin film roll with which bag forming processing by lamination is able to be performed smoothly and with high yield ratio and at the same time with which packages free of S-shaped curls can be obtained efficiently. A solution for the problem concerns the polyamide based mixed resin film roll of the present invention which includes a first sample cutout portion within 2 m from the winding end of film and a final cutout portion within 2 m from the winding start of film, and when a sample cutout portion is set up in approximately every 100 m from the first sample cutout portion, in all samples cut out from each of the cutout portions, physical properties such as elastomer content, elastic modulus in tension, boiling water shrinkage percentage and refraction index in the thickness direction are adjusted to be within a predetermined range of variation range.

25 Claims, No Drawings

POLYAMIDE BASED MIXED RESIN FILM ROLL AND PROCESS FOR PRODUCING THE SAME

This is a 371 national phase application of PCT/JP2005/023511 filed 21 Dec. 2005, claiming priority to Japanese Patent Applications No. 2005-106660 filed 1 Apr. 2005, No. 2005-156234 filed 27 May 2005, and No. 2005-203302 filed 12 Jul. 2005, the disclosures of which are incorporated herein by reference.

TECHNICAL FIELD

The present invention relates to a film roll having high quality and homogeneous mechanical properties over a long length by winding up a polyamide based resin film, and specifically, to a polyamide based resin film roll with excellent workability in use of packaging such as retort food by laminating with a polyolefin based resin film.

BACKGROUND ART

A biaxially oriented polyamide based resin film composed of nylon in major components is excellent in toughness, gas-barrier, pinhole resistance, transparency, printing property and the like, so that it is widely utilized as a packaging material in various kinds of foods such as a variety of liquid food, aqueous food, frozen food, retort food, paste food, cattle meat and aquatic food. Particularly in recent years, it is used extensively in packaging of retort food. Such polyamide based resin film is laminated with polyolefin based resin films such as polyethylene and polypropylene, folded in two parallel to its machine direction, then thermally adhered in three sides and cut out to give a bag with one side opened and three edges sealed in an opened state, in which various kinds of food etc. are filled and sealed, then sterilized by heating in boiling water before being supplied to market.

In the case of using polyamide based resin film, however, there are some instances that warpage occurs at corners of packaging bag after heat sterilization treatment to yield a curling phenomenon of four sides in S-shape (hereinafter called S-shaped curl phenomenon), resulting in remarkable deterioration of appearance as packaging goods. Therefore, regarding a method of reducing such curl phenomenon, as shown in Patent reference 1, there has been proposed a method to adjust a biaxially oriented polyamide based resin film to a specified value of product of its boiling water shrinkage percentage and percentage change of molecular orientation angle in the direction of film width, but the method needs an extremely high temperature in thermal fixation or excess thermal relaxation after stretching to enhance dimensional stability in boiling water treatment, thus it poses problems that the toughness and pinhole resistance of the resultant film are deteriorated.

Therefore, the present inventors have devised and proposed a method for obtaining a biaxially oriented polyamide based resin film free from S-shaped curl phenomenon without lowering toughness and pinhole resistance by adjusting boiling water shrinkage percentage and refraction index of film within a specified numeric range as described in Patent reference 2.

Patent reference 1: Japanese Unexamined Patent Publication Hei 4-103335 (1992)
Patent reference 2: Japanese Unexamined Patent Publication Hei 8-174663 (1996)

DISCLOSURE OF THE INVENTION

Problems to be Solved by the Invention

According to the method of Patent reference 2 described above, it becomes possible to obtain a biaxially oriented polyamide based resin film free from S-shaped curl phenomenon having excellent toughness and pinhole resistance. However, in a bag forming processing by lamination, since conditions of pressure and time in thermal adhesion are finely adjusted for every film roll used, even in the case where the average values of boiling water shrinkage percentage and refraction index of the film wound up in a film roll are in the range of Patent reference 2, when degree of variation in one film roll is large, wrinkle takes place between films each other on lamination in a bag forming processing, which tends to pose troubles such as bad yield ratio.

On the other hand, the present inventors have proposed, in a production method of biaxially stretched film roll by winding up a biaxially stretched film after melt extrusion of a plurality of resins mixed, as a method to reduce variation of coefficient of dynamic friction, a method to reduce segregation of feedstock by homogenizing the shape of feedstock chip or enlarging the angle of slope of a funnel-shaped hopper as a feed section of feedstock into an extruder (Japanese Unexamined Patent Publication 2004-181777). However, the method also cannot necessarily be conclusive for a method to suppress the variation and fluctuation of mechanical properties such as boiling water shrinkage percentage and refraction index of film wound in a film roll.

As a result of committed research on production techniques to produce a biaxially stretched film roll with high homogeneity, the present inventors invented a polyamide based resin film roll with high homogeneity in film thickness, boiling water shrinkage percentage and refraction index, and other physical properties and capable of bag forming processing smoothly with good yield ratio free of wrinkles between films efficiently at lamination (Japanese Unexamined Patent Publication 2004-262922).

DISCLOSURE OF THE INVENTION

Problems to be Solved by the Invention

According to the polyamide based resin film roll with high homogeneity in film thickness, boiling water shrinkage percentage and refraction index, and other physical properties as described above, the processing capability at the lamination can be improved without impairing satisfactory toughness and pinhole resistance of polyamide based resin film as well as without generating S-shaped curl phenomenon. However, the film composed with polyamide based rein only has limitations in the pinhole resistance, and is not always said suited for packaging applications of food containing a large volume of water such as liquid soup, etc. In addition, as a means to improve the pinhole resistance of polyamide based resin film, a method of filling the film material, polyamide based resin with elastomer is known, but in such mixed resin film roll, satisfactory processing capability is unable to be obtained at the lamination only by reducing variations of physical properties such as film thickness, boiling water shrinkage percentage, refraction index, or other physical properties and variations are generated in the pinhole resistance in each of laminated bags with one side opened and three edges sealed in an opened state.

The present invention has been achieved as a result of committed research and development on production technique to produce a biaxially stretched film roll with high homogeneity formed by mixed resin of polyamide based resin and elastomer, and the object is to solve the problems of conventional polyamide based mixed resin film roll, and to provide a biaxially oriented polyamide based mixed resin film roll capable of applying to package application which requires extremely high pinhole resistance and capable of bag forming processing smoothly by lamination with almost no troubles to give a package free from S-shaped curl efficiently. Another object is to provide a biaxially oriented polyamide based mixed resin film roll capable of obtaining a processed goods with high yield ratio in a post treatment like bag forming processing. In addition, another object is to provide a production method which can efficiently produce such a biaxially oriented polyamide based mixed resin film roll.

Means to Solve the Problems

Of the present inventions, the constituent of the invention described in claim 1 is a film roll wound up of film formed with a mixed resin consisting of polyamide based resin and thermoplastic elastomer in a width of 0.2 m (m is meter) or more, 3.0 m or less, and a length of 300 m or more, 30000 m or less, the polyamide based resin mixed film roll comprising: setting up a first sample cutout portion within 2 m from the winding end of film; and a final cutout portion within 2 m from the winding start of film, wherein when a sample cutout portion is set up in approximately every 100 m from the first sample cutout portion, the following requirements (1) and (2) are satisfied;
(1) when the content of thermoplastic elastomer constituent is measured for each sample cut out from each of the cutout portions, and the average content rate which is the average value of these content rates is computed, the degree of variability of the content of thermoplastic elastomer constituent of all the samples is within the ±10% range with respect to the average content rate.
(2) the degree of variability of thickness throughout the full length in the longitudinal direction of a wound-up roll is within the range of ±2% to ±10% with respect to the average thickness.

The constituent of the invention described in claim 2 is a film roll wound up of film formed with a mixed resin consisting of polyamide based resin and thermoplastic elastomer in a width of 0.2 m or more, 3.0 m or less, and a length of 300 m or more, 30000 m or less, the polyamide based mixed resin film roll comprising: setting up a first sample cutout portion within 2 m from the winding end of film; and a final cutout portion within 2 m from the winding start of film, wherein when a sample cutout portion is set up in approximately every 100 m from the first sample cutout portion, the following requirement (3) is satisfied:
(3) when the elastic modulus in tension in the film take windup direction is measured for each sample cut out from each of the cutout portions, the average elastic modulus in tension which is the average value of elastic moduli of the samples, is 1.30 GPa (1300 N/mm$^2$) or more and less than 2.50 GPa (2500 N/mm$^2$) and at the same time the degrees of variability of all samples are included in the range of ±10% with respect to the average elastic modulus in tension.

The constituent of the invention described in claim 3 is a film roll wound up of film formed with a mixed resin consisting of polyamide based resin and thermoplastic elastomer in a width of 0.2 m or more, 3.0 m or less, and a length of 300 m or more, 30000 m or less, the polyamide based mixed resin film roll comprising: setting up a first sample cutout portion within 2 m from the winding end of film; and a final cutout portion within 2 m from the winding start of film, wherein when a sample cutout portion is set up in approximately every 100 m from the first sample cutout portion, the following requirement (4) is satisfied:
(4) the number of pinholes when a 3000-cycle bending test is continuously carried out on each sample cut out from each cutout portion at the speed of 40 cycles per minute using a Gelvo type Flex-Cracking Tester is 10 or less in all cases.

The constituent of the invention described in claim 4 is, in the invention described in any of claims 1 through 3, the roll wherein when a maximum boiling water shrinkage percentage of each sample cut out from each of the cutout portions is measured, the maximum boiling water shrinkage percentage being the maximum value of boiling water shrinkage percentages in all directions, an average boiling water shrinkage percentage which is average of the maximum boiling water shrinkage percentages is 3% to 6%, and a degree of variability in the maximum boiling water shrinkage percentages of all samples is within ±2% to ±10% relative to the average boiling water shrinkage percentage.

The constituent of the invention described in claim 5 is, in the invention described in any of claims 1 through 3, the roll wherein when a directional difference of boiling water shrinkage percentage of each sample cut out from each of the cutout portions is measured, the directional difference of boiling water shrinkage percentage being the difference between a boiling water shrinkage percentage in the direction of +45° to the longitudinal direction and a boiling water shrinkage percentage in the direction of −45° to the longitudinal direction in an absolute value, an average directional difference of boiling water shrinkage percentage which is the average of the directional differences of boiling water shrinkage percentage is 1.5% or less, and a degree of variability in the directional differences of boiling water shrinkage percentage of all samples is within ±2% to ±10% relative to the average directional difference of boiling water shrinkage percentage.

The constituent of the invention described in claim 6 is, in the invention described in any of claims 1 through 3, the roll wherein when refraction index in the thick direction of each sample cut out from each of the cutout portions is measured, an average refraction index which is the average of the refraction indexes is 1.500 or more, 1.520 or less, and a degree of variability in the refraction indexes of all samples is within ±2% relative to the average refraction index.

The constituent of the invention described in claim 7 is, in the invention described in any of claims 1 through 3, the roll wherein the major component of polyamide composing the polyamide based mixed resin film is nylon 6.

The constituent of the invention described in claim 8 is, in the invention described in any of claims 1 through 3, the roll wherein the major component of thermoplastic elastomer composing the polyamide based mixed resin film is at least one kind of polyamide-based elastomer and polyolefin-based elastomer.

The constituent of the invention described in claim 9 is, in the invention described in any of claims 1 through 3, the roll wherein the polyamide based mixed resin film wound up is laminated with a polyolefin based resin film.

The constituent of the invention described in claim 10 is, in the invention described in any of claims 1 through 3, the roll which is a polyamide based mixed resin film wound up wherein an unoriented sheet-like material obtained by extruding molten polyamide based resin from a T-die and cooling by contact with a metal roll is biaxially stretched.

The constituent of the invention described in claim 11 is, in the invention described in any of claims 1 through 3, the roll which is a polyamide based mixed resin film wound up being stretched by a tenter stretching method.

The constituent of the invention described in claim 12 is, in the invention described in any of claims 1 through 3, the roll which is a polyamide based mixed resin film wound up being sequentially biaxially stretched.

The constituent of the invention described in claim 13 is, in the invention described in any of claims 1 through 3, the roll which is a polyamide based mixed resin film wound up being biaxially stretched in the longitudinal direction and the transverse direction.

The constituent of the invention described in claim 14 is, in the invention described in any of claims 1 through 3, the roll which is a polyamide based mixed resin film wound up wherein an essentially unoriented sheet-like material of the main component of polyamide based resin is stretched in at least two stages in the longitudinal direction in threefold or more at a higher temperature than the glass transition temperature of the polyamide based resin plus 20° C., then stretched in the transverse direction in threefold or more.

The constituent of the invention described in claim 15 is, in the invention described in any of claims 1 through 3, the roll which is a polyamide based mixed resin film wound up being thermally fixed after a final stretching treatment.

The constituent of the invention described in claim 16 is, in the invention described in any of claims 1 through 3, the roll which is a polyamide based mixed resin film wound up being relaxed after thermal fixation.

The constituent of the invention described in claim 17 is, in the invention described in any of claims 1 through 3, the roll wherein at least one kind selected from the group consisting of lubricant, anti-blocking agent, thermal stabilizer, antioxidant, antistatic agent, light resistant agent and impact modifier is added to the polyamide based mixed resin film wound up.

The constituent of the invention described in claim 18 is, in the invention described in any of claims 1 through 3, the roll wherein inorganic particle is added to the polyamide based mixed resin film wound up.

The constituent of the invention described in claim 19 is, in the invention described in any of claims 1 through 3, the roll wherein the inorganic particle is a silica particle of 0.5-5.0 μm in an average diameter.

The constituent of the invention described in claim 20 is, in the invention described in any of claims 1 through 3, the roll wherein a higher fatty acid is added to the polyamide based mixed resin film wound up.

The constituent of the invention described in claim 21 is a production method of polyamide based mixed resin film roll according to any of claims 1 through 3, comprising: a step of film forming while melt-extruding polyamide based resin chip and thermoplastic elastomer chip; a step of biaxial stretching wherein an unstretched film obtained in the step of film forming is stretched biaxially in the longitudinal direction and the transverse direction; and a step of roll forming by winding up the biaxially stretched film, and satisfies the following requirements (1) and (2).
(1) The step of film forming includes melt extrusion after polyamide based resin chip and thermoplastic elastomer chip are mixed, wherein the shape of each chip used is elliptic cylinder having elliptic cross section with a major axis and a minor axis, and the thermoplastic elastomer chip is adjusted each in its average major axis, average minor axis and average chip length so as to be within a range of ±20% relative to the average major axis, average minor axis and average chip length of the polyamide based resin chip.
(2) The step of film forming includes melt extrusion after polyamide based resin chip and thermoplastic elastomer chip are mixed, wherein mixing of the polyamide based resin chip and thermoplastic elastomer chip is performed with a sublimation segregation inhibitor.

The constituent of the invention described in claim 22 is, in the invention described in claim 21, the method wherein the step of biaxial stretching includes a stretching in the transverse direction after a stretching in the longitudinal direction in two stages and the stretching ratio in the first stage of two-stage stretching in the longitudinal direction in the step of biaxial stretching is higher than the stretching ratio in the second stage.

The constituent of the invention described in claim 23 is, in the invention described in claim 21, the method which comprises a step of melt extrusion using an extruder equipped with a funnel-shaped hopper as a feed section of material chip, wherein an angle of slope of the hopper is adjusted to 65° or more, a water content of polyamide based resin chip and thermoplastic elastomer chip before being fed to the hopper is adjusted to 800 ppm or more, and 1000 ppm or less, and furthermore a temperature of polyamide based resin chip and thermoplastic elastomer chip before being fed to the hopper is adjusted to 80° C. or more.

The constituent of the invention described in claim 24 is, in the invention described in claim 21, the method which comprises a step of preheating conducted before a step of longitudinal stretching and a step of thermal treatment conducted after the step of longitudinal stretching in the step of biaxial stretching, wherein a variation width of surface temperature of film at any point of the step of preheating, the step of thermal treatment and the step of longitudinal stretching is adjusted over the entire film length within a range of ±1° C. to the average temperature.

The constituent of the invention described in claim 25 is, in the invention described in claim 21, the method wherein the step of film forming includes a roll cooling step of winding up melted resin extruded from an extruder on a cooling roll, wherein a part contacting the melted resin with the surface of cooling roll is sucked over the entire width of melted resin by a suction unit in the opposite direction to the winding up direction.

Effect of the Invention

Using the polyamide based mixed resin film roll of the present invention, bag forming processing of each of laminated bags with one side opened and three edges sealed in an opened state for packaging liquid soup, etc. where a high degree of pinhole resistance is required can be conducted smoothly by lamination with almost no troubles to give a package free from S-shaped curl efficiently. Also, it becomes possible to obtain a processed goods with high yield ratio in a post treatment like bag forming processing. In addition, in use of the polyamide based mixed resin film roll of the present invention, a bag for food packaging after bag forming processing provides remarkably high pinhole resistance and at the same time, variations of pinhole resistance for each bag can be reduced.

In addition, according to the process for producing polyamide based mixed resin film roll, polyamide based mixed resin film roll with remarkably high pinhole resistance as well as excellent lamination processing capabilities can be obtained inexpensively and extremely efficiently.

BEST MODE FOR CARRYING OUT THE INVENTION

The polyamide based mixed resin film roll according to the present invention must have the degree of variability of the content of thermoplastic elastomer component of all samples to be within the range of ±10% with respect to the average content when samples are cut out in a method describe later, and for each of cutout samples, the content of thermoplastic elastomer is measured and the average content which is the average of these contents is computed.

The cutout of sample in the present invention is first set up to be a first sample cutout portion within 2 m from the winding end of film and a final cutout portion within 2 m from the winding start of film, and a sample cutout portion is to be set up in approximately every 100 m from the first sample cutout portion. Additionally, "approximately every 100 m" means that a sample may be cut out in about 100 m±1 m.

The above-mentioned cutout of sample will be more specifically described as follows; for example, when a roll of polyamide based film is wound in a length of 498 m, a first sample (1) is cut out within 2 m from the winding end of film. Additionally, the cutout of sample is for convenience cut into a rectangle having a side along the longitudinal direction and a side perpendicular to the longitudinal direction (not to be cut out on a slant). Subsequently, a second sample (2) is cut out in a part 100 m apart toward the winding start side from the part cut out. Similarly a third sample (3) in apart 200 m a part toward the winding start side, a fourth sample (4) in a part 300 m apart toward the winding start side, and a fifth sample (5) in a part 400 m apart toward the winding start side are cut out. When samples are cut out in this way, the rest becomes shorter than 100 m, thus a sixth (final) sample (6) is cut out in any part within 2 m from winding start of film.

For each of samples cut out, the content of the thermoplastic elastomer component is quantitatively assayed and the average content which is the average of these contents is computed; in such event, the degree of variability of the content of thermoplastic elastomer component of all samples must be within the range of ±10% with respect to the average content. Here, a degree of variability of the thermoplastic elastomer component content of all samples means a ratio of the difference between the maximum or the minimum elastomer component content and the average content, whichever larger, to the average content, when the maximum and the minimum thermoplastic elastomer component contents (measured values) of all samples are found. Additionally, the thermoplastic elastomer component content is able to be measured by a method to form a super thin piece by slicing the film perpendicular to the surface, dye the elastomer component with a specific substance, and compute an area ratio of the dyed portion to the overall area, as described later, or is able to be measured by other methods such as infrared spectroscopic analysis or NMR spectroscopic analysis, etc. focused on peaks specific to elastomer.

The polyamide based mixed resin film roll according to the present invention has the degree of variability of elastomer component content of all samples cut out to be preferably within a range of ±9% of the average content, and more preferably within a range of ±8%, and still more preferably within a range of ±7%.

In addition, it is preferable for the polyamide based mixed resin film roll according to the present invention to have as small the degree of variability of elastomer component content of all samples cut out as possible but the lower limit of the relevant degree of variability is assumed to be about 2% with the measurement accuracy taken into account.

It is preferable for the polyamide based mixed resin film roll according to the present invention to have the average elastic modulus in tension, which is the average of elastic moduli in tension when the elastic modulus in tension is measured for each sample cut out from each cutout portion, of 1.30 GPa (1300 N/mm$^2$) or more, and less than 2.50 GPa (2500 N/mm$^2$) and at the same time, the degree of variability of elastic moduli in tension of all samples adjusted within the range of ±10% with respect to the average elastic modulus in tension. Here, a degree of variability of the elastic modulus in tension of all samples means a ratio of the difference between the maximum or the minimum elastic modulus in tension and the average elastic modulus in tension, whichever larger, to the average elastic modulus in tension, when the maximum and the minimum elastic moduli in tension (measured values) of all samples are found.

The elastic modulus in tension of polyamide based mixed resin film that composes polyamide based mixed resin film roll is important to increase toughness and pinhole resistance of the film itself, and when the elastic modulus in tension is less than 1.30 GPa, insufficient toughness and pinhole resistance results, and on the contrary, when the elastic modulus in tension exceeds 2.50 GPa, the tear strength is degraded when the film is formed into a three-edge sealed bag, which is not preferable. The range of elastic modulus in tension which is preferable for increasing toughness, pinhole resistance, and tear strength when a three-edge sealed bag is formed is more preferably a range between 1.50 GPa and 2.30 GPa.

For the polyamide based mixed resin film roll according to the present invention, the degree of variability of elastic modulus in tension of all cut-out samples is preferably within the range of ±9% of the average elastic modulus in tension, and more preferably within the range of ±8%, and still more preferably within the range of ±7%.

In addition, it is preferable for the polyamide based mixed resin film roll according to the present invention to have as small the degree of variability of elastic modulus in tension of all cutout samples as possible but the lower limit of the relevant degree of variability is assumed to be about ±2% with the measurement accuracy taken into account.

Furthermore, it is preferable for the polyamide based mixed resin film roll according to the present invention to have the number of pinholes adjusted to be 10 pieces or less in all cases when a 3000-cycle bending test is continuously carried out on each sample cut out from each cutout portion at the speed of 40 cycles per minute using a Gelvo type Flex-Cracking Tester.

[Measuring Method of the Pinhole Resistance]

A film laminated with polyolefin film, etc. and cut into a predetermined size (20.3 cm×27.9 cm) is conditioned throughout a predetermined time under a predetermined temperature and humidity; then, the rectangular test film is wound on to make a cylindrical shape with a predetermined length. And both ends of the cylindrical film are fixed to the outer circumference of a disk-shape fixed head as well as to the outer circumference of a disk-shape mobile head of the Gelvo type Flex-Cracking Tester, the mobile head is rotated at a predetermined angle (440°) while it is being brought closer by a predetermined length (7.6 cm) in the fixed head direction along the axes of both heads opposite in parallel, and then, is allowed to go straight ahead by a predetermined length (6.4 cm) without rotating; then, these operations are reversely performed to return the mobile head to the original position. This constitutes one cycle of bend test. The bend test is continuously repeated at a predetermined speed (40 cycles per minute) by predetermined cycles (3000 cycles). Then, the number of pinholes generated at a portion of a predetermined range (497 cm$^2$) is counted, with the portions of the outer circumferences of the tested film excluded, to which the fixed head and the mobile head are fixed.

In addition, for the polyamide based mixed resin film roll of the present invention, it is preferable that an average boiling water shrinkage percentage which is the average of the maximum boiling water shrinkage percentages is adjusted to be 3% or more and 6% or less when a maximum boiling water shrinkage percentage which is the maximum value of boiling water shrinkage percentages in all directions for all samples is measured, in the case of cutting out a sample in a method described later.

Also, in the case of cutting out a sample in a method described later, when a directional difference of boiling water shrinkage percentage of a polyamide based mixed film roll of the present invention is measured, the directional difference of boiling water shrinkage percentage being the absolute value of the difference between a boiling water shrinkage percentage in the direction of +45° to the longitudinal direction and a boiling water shrinkage percentage in the direction of −45° to the longitudinal direction for all samples, an average directional difference of boiling water shrinkage percentage which is the average of the directional differences of boiling water shrinkage percentage is adjusted to be 1.5% or less.

[Measuring Methods of Boiling Water Shrinkage Percentage (BS), Maximum Boiling Water Shrinkage Percentage (BSx), Average boiling water shrinkage percentage (BSax), Directional Difference of Boiling Water Shrinkage Percentage (Bsd) and Average Directional Difference of Boiling Water Shrinkage Percentage (BSad)]

A biaxially oriented polyamide based resin film cut out from each of cutout portions of polyamide based resin film roll is cut out into a square, allowed to stand in an atmosphere of 23° C. and 65% RH for 2 hours and more. A circle centered on this sample (about 20 cm in diameter) is drawn, a longitudinal direction (direction of film drawn out) is set to be 0°, liner lines passing to the center of circle are clockwise drawn at intervals of 15° in the direction of 0 to 165°, diameter in each direction is measured as the length before treatment. Then, after the sample cut out is thermally treated in boiling water for 30 minutes, it is brought back and water attached on its surface is wiped out, dried in air, allowed to stand in an atmosphere of 23° C. and 65% RH for 2 hours or more, the length of linear line drawn to each diametrical direction is measured as the length after treatment as described above. Then, according to the following formulas 1 to 5, the following values are measured, which are, a BS (boiling water shrinkage percentage), BSx (maximum boiling water shrinkage percentage), BSax (average boiling water shrinkage percentage), BSd (directional difference of boiling water shrinkage percentage) and BSad (average directional difference of boiling water shrinkage percentage).

$BS=[(\text{length before treatment}-\text{length after treatment})/\text{length before treatment}]\times 100(\%)$  1

$BSx=\text{maximum shrinkage percentage (\%) of values measured in 0 to 165° directions at intervals of 15°}$  2

$BSax=\text{summation of } BSx\text{'s of all samples/number of samples}$  3

$BSd=|(BS \text{ in } 45° \text{ direction})-(BS \text{ in } 135° \text{ direction})|$  4

$BSad=\text{summation of } BSd\text{'s of all samples/number of samples}$  5

Additionally, BSx value of polyamide film composing a polyamide based film roll is important from the points for enhancing toughness and pinhole resistance of film itself as well as for maintaining thermal resistance in hot-water treatment for biaxially oriented polyamide based resin film being formed in a bag-shape (it is called laminate strength or heat-resistant laminate strength). When BSx value is less than 3%, toughness and pinhole resistance become insufficient, whereas when more than 6%, lamination becomes poor, heat-resistant laminate strength in hot-water treatment becomes insufficient, which is not preferable. Preferable range of BSx is 3.5-5.0% for enhancing toughness, pinhole resistance, lamination property and heat-resistant laminate strength.

Also, BSd value of polyamide film composing a polyamide based film roll greatly affects a curl phenomenon occurring in boiling water treatment. That is, the larger the BSd, the more easily a bag is warped into a notable curl. However, when BSd is suppressed to 1.5% or less, preferably 1.2% or less, warpage of bag in boiling water treatment can be remarkably suppressed, which can prevent the occurrence of S-shaped curl phenomenon.

Also, for a polyamide based mixed resin film roll of the present invention, it is preferable that a degree of variability in the maximum boiling water shrinkage percentage (BSx) of all samples cut out is adjusted within ±2% to ±10% (±2% or more and ±10% or less) relative to the average boiling water shrinkage percentage (BSa). Here, a degree of variability in the maximum boiling water shrinkage percentages (BSx) of all samples means a ratio of the difference between the maximum or the minimum boiling water shrinkage percentage and the average boiling water shrinkage percentage, whichever larger, to the average boiling water shrinkage percentage, when the maximum and the minimum in the maximum boiling water shrinkage percentages (BSx) of all samples are found.

Namely, in a polyamide based film roll of the present invention, when boiling water shrinkage percentage of samples (1) through (6) is denoted as Xn (n=1 to 6), both the difference between Xmax, the maximum value of Xn and average boiling water shrinkage percentage (BSax) and the difference between Xmin, the minimum value and average boiling water shrinkage percentage (BSax) are required to be within ±10%. In other words, |Bsax−Xn| (additionally | |  indicates absolute value) are all required to be 10% or less.

Additionally, in a polyamide based film roll of the present invention, a degree of variability in the maximum boiling water shrinkage percentages (BSx) of all samples cut out is preferably within ±9% relative to the average boiling water shrinkage percentage (BSa), more preferably within ±8%, and further preferably within ±7%.

In addition, in a polyamide based film roll of the present invention, a lower degree of variability in the maximum boiling water shrinkage percentages (BSx) of all samples cut out is preferable, but we are considering that the lower limit of the degree of variability is limited to about 2% from the consideration of precision in the measurement.

Also, for a polyamide based film roll of the present invention, a degree of variability in the directional differences of boiling water shrinkage percentages (BSd) of all samples cut out is required to be adjusted within ±2% to ±10% (±2% or more and ±10% or less) relative to the average directional difference of boiling water shrinkage percentage (BSad). Here, a degree of variability in the directional differences of boiling water shrinkage percentages (BSd) of all samples means, when the maximum and the minimum in the directional differences of boiling water shrinkage percentages (BSd) of all samples are obtained, from which a larger value of the difference between either the maximum or the minimum and the average directional difference of boiling water shrinkage is obtained, a ratio of which to the average boiling water shrinkage percentage.

Namely, in a polyamide based film roll of the present invention, when directional difference of boiling water shrinkage percentage of samples (1) through (6) is denoted as Yn (n=1 to 6), both the difference between Ymax, the maximum value of Yn and average directional difference of boiling water shrinkage percentage (BSad) and the difference between Ymin, the minimum value and average directional difference of boiling water shrinkage percentage (BSad) are required to be within ±10%, in other words, |BSad−Yn| (additionally | | indicates absolute value) are all required to be 10% or less.

Additionally, in a polyamide based film roll of the present invention, a degree of variability in the directional differences of boiling water shrinkage percentage (BSd) of all samples cut out is preferably within ±9% relative to the average directional difference of boiling water shrinkage percentage (BSad), more preferably within ±8%, and further preferably within ±7%.

In addition, in a polyamide based film roll of the present invention, a lower degree of variability in the directional differences of boiling water shrinkage percentage (BSd) of all samples cut out is preferable, but we are considering that the lower limit of the degree of variability is limited to about 2% from the consideration of precision in the measurement.

Also, in a polyamide based film roll of the present invention, a degree of variability in thickness over the entire length in the longitudinal direction is required to be adjusted within ±2% to ±10% (±2% or more and ±10% or less) relative to the average thickness. Here, a degree of variability in thickness over the entire length in the longitudinal direction means, when the maximum and the minimum in the thickness over the entire length in the longitudinal direction of all samples are obtained, from which a larger value of the difference between either the maximum or the minimum and the average thickness is obtained, a ratio of which to the average thickness.

Namely, in a polyamide based film roll of the present invention, both the difference between Tmax, the maximum value in thickness over the entire length in the longitudinal direction and the average thickness (Ta, average thickness over the entire length in the longitudinal direction) and the difference between Tmin, the minimum value and the average thickness (Ta) are required to be within ±10%.

Additionally, in a polyamide based film roll of the present invention, a degree of variability in thickness over the entire length in the longitudinal direction is preferably within ±8% relative to the average thickness (Ta), more preferably within ±6%.

In addition, in a polyamide based film roll of the present invention, a lower degree of variability in thickness over the entire length in the longitudinal direction is preferable, but we are considering that the lower limit of the degree of variability is limited to about 2% from the performance of film forming apparatus.

In addition, in a polyamide based film roll of the present invention, in the case where a sample is cut out in the foregoing method, when refraction index (Nz) in the thickness direction of all samples are measured, an average refraction index (Nza) which is the average of the refractive indexes is preferably adjusted to be 1.505 or more, 1.520 or less. Additionally, the average refraction index is calculated by the following formula 6.

$$Nza = \text{summation of } Nz\text{'s of all samples/number of samples} \qquad 6$$

Additionally, Nz value of polyamide film composing polyamide based film roll greatly affects film grade such as laminate strength and thickness irregularity. Thus, the requirement of average refraction index of 1.505 or more and 1.520 or less is an essential requirement in use of biaxially oriented polyamide based resin film laminated with a polyolefin based resin film. When Nz is less than 1.505, laminate strength with a polyolefin based resin film etc. becomes insufficient, which tends to cause peeling between the film and laminated substrate in boiling water treatment after bag forming. Moreover, the Nz is lowered sequentially in a process of biaxial stretching of unstretched polyamide based resin film. In other words, Nz is thought to be an index of stretching, larger Nz indicates insufficient stretching, thus a film with Nz of more than 1.520 remarkably displays thickness irregularity due to insufficient stretching, giving an unsatisfactory film grade. Particularly preferable range of Nz is in a range of 1.507 to 1.516 from the considerations of both laminate strength and film grade.

Also, in a polyamide based film roll of the present invention, a degree of variability in the refraction index (Nz) of all samples cut out is preferably adjusted within ±2% relative to the average of refraction indexes (hereinafter called an average refraction index). Here, a degree of variability in the refraction index (Nz) of all samples means, when the maximum and the minimum in the refraction index (Nz) of all samples are obtained, from which a larger value of the difference between either the maximum or the minimum and the average refraction index is obtained, a ratio of which to the average refraction.

Namely, in a polyamide based film roll of the present invention, when refraction index of samples (1) through (6) is denoted as Nz1 to Nz6, both the difference between Nzmax, the maximum value of Nz1 to Nz6 and the average refraction index, and the difference between Nzmin, the minimum value of Nz1 to Nz6 and the average refraction index are preferably within ±2%, in other words, all of |average refraction index−Nz1| to |average refraction index−Nz6| are preferably 2% or less. Also, in a polyamide based film roll of the present invention, a degree of variability in the refraction index (Nz) of all samples cut out is more preferably within ±1% relative to the average refraction index.

In addition, in a polyamide based film roll of the present invention, a lower degree of variability in the refraction index (Nz) of all samples cut out is preferable, but we are considering that the lower limit of the degree of variability is limited to about 0.1% from the considerations of precision in the measurement and precision of machine.

As described above, by reducing variations of the elastomer component content and film thickness in one polyamide based mixed resin film roll, it becomes possible to prevent appearance deterioration in bag forming processing and lamination processing of three-edge sealed bags for packaging liquid soup, etc. where a high degree of pinhole resistance is required, and the film can be processed smoothly with good yield ratio.

As a polyamide resin used in the present invention, for example, there can be listed nylon 6 of ε-caprolactam as a major raw material. Also, as other polyamide resins, there can be listed a polyamide resin obtained by polycondensation of lactam with three-membered ring or more, ω-amino acid, dicarboxylic acid and diamine. Specifically, lactams include enantlactam, capryllactam, lauryllactam other than ε-caprolactam above-mentioned; ω-amino acids include 6-aminocaproic acid, 7-aminoheptanoic acid, 9-aminononanoic and 11-aminoundecanoic acid. Also, dicarboxylic acids include adipic acid, glutaric acid, pimelic acid, suberic acid, azelaic acid, sebacic acid, undecanedione acid, dodecadione acid, hexadecadione acid, eicosandione acid, eicosadienedione acid, 2,2,4-trimethyladipic acid, terephtahlic acid, isophthalic acid, 2,6-naphtahalene dicarboxylic acid, and xylylenedicarboxylic acid. Further, diamines include ethylenediamine, trimethylenediamine, tetramethylenediamine, hexamethylenediamine, pentamethylenediamine, undecamethylenediamine, 2,2,4 (or, 2,4,4)-trimethylhexamethylenediamine, cyclohexanediamine, bis-(4,4'-aminocyclohexyl) methane, and methaxylylenediamine. Polymers obtained by polycondensation of these chemicals and copolymers thereof, for example, nylons 6, 7, 11, 12, 6.6, 6.9, 6.11, 6.12, 6T, 6I, MXD6 (methaxyleneadipamide 6), 6/6.6, 6/12, 6/6T, 6/6I, 6/MXD6 can be used. In addition, in the case of producing polyamide film roll of the present invention, the above polyamide resin can be used alone or in a mixture of 2 kinds or more thereof.

Additionally, of the above polyamide based resins, particularly preferable resin in the present invention has relative viscosity in a range of 2.0 to 3.5. The relative viscosity of polyamide based resin affects toughness of biaxially stretched film obtained and stretching property. That is, when relative viscosity is less than 2.0, impact strength becomes somewhat insufficient, whereas when relative viscosity is more than 3.5, sequentially biaxially stretching property tends to be bad because of increase in stretching stress. Additionally, the relative viscosity in the present invention means a value that a solution of 0.5 g of polymer dissolved in 50 ml of 97.5% sulfuric acid is measured at 25° C.

For thermoplastic elastomer used in the present invention, for example, polyamide based elastomers of block or random copolymers, etc. of polyamide based resin such as nylon 6, nylon 12, etc. and PTMG (polytetramethylene glycol) or PEG (polyethylene glycol), etc., ethylene-methacrylic acidcopolymer, copolymer of ethylene and butane, copolymer of styrene and butadiene, and other polyolefin based elastomers, ethylene based ionomers and other olefin based resin ionomers, etc. can be suitably used.

In addition, the amount of thermoplastic elastomer to be added to polyamide based resin is not particularly limited, but the lower limit of addition amount is preferably 1% by weight or more, and more preferably 2% by weight or more, and still more preferably 3% by weight or more. On the other hand, the upper limit of addition amount is preferably 15% by weight or less, and more preferably 10% by weight or less, and still more preferably 6% by weight or less. When the addition amount of thermoplastic elastomer is below 1% by weight, satisfactory pinhole resistance is unable to be obtained, which is not preferable, and on the contrary, when the addition amount of thermoplastic elastomer exceeds 15% by weight, toughness of film is lost, which is not preferable.

Next, a preferable production method for obtaining a polyamide based resin film roll of the present invention will be described. The polyamide based resin film roll of the present invention is produced as follows: an unstretched film obtained by melt extrusion of polyamide resin chip of raw material is stretched biaxially in the longitudinal direction (length direction) and transverse direction (width direction) and wound up in a roll.

The present inventors have studied on thickness irregularity of film roll in the longitudinal direction (thickness irregularity over the entire length of film roll), and variation and fluctuation of physical properties like boiling water shrinkage percentage, as a result, it has been found that the thickness irregularity in the longitudinal direction, and variation and fluctuation of the physical properties are largely influenced by various factors mainly in a casting step of melted resin into an unstretched film. Namely when a resin fed into a funnel-shaped hopper (hereinafter simply called hopper) connected directly with an extruder has a low temperature, or a resin fed into a hopper has a high water content, thickness irregularity of the unstretched film in the longitudinal direction becomes large, and variation and fluctuation of the physical properties of the biaxially stretched film become large. It has been also found that thickness irregularity of the unstretched film in the longitudinal direction becomes large and variation and fluctuation of the physical properties of the biaxially stretched film become large when contact point between the resin and a metal roll is in turbulence in winding resin extruded from a T-die on the metal roll. Further, it has been found that when stretching conditions are not suitable in a step of biaxial stretching, thickness irregularity of the unstretched film in the longitudinal direction is amplified, increasing variation and fluctuation of the physical properties.

Further, the present inventors have keenly studied on the basis of the foregoing facts. As a result, they learned that in producing a film roll, a film roll with less variation of physical properties can be obtained by the following measures:
(1) uniformity of shape of polyamide based resin chip and elastomer chip;
(2) reduction of water content in drying resin chip;
(3) retention of temperature in feeding resin to hopper;
(4) optimization of hopper shape;
(5) addition of segregation inhibitor in mixing resin;
(6) removal of detrimental effects by adding segregation inhibitor; and
(7) optimization of stretching condition.

Each of the above measures will be sequentially described below.

(1) Uniformity of Shape of Polyamide Based Resin Chip and Elastomer Chip

In the production of polyamide based mixed resin film roll of the present invention, after materials, polyamide resin chips, and elastomer chips are blended in the hopper, they are melted, blended, and extruded from an extruder, and formed into film (so-called a blending system). That is, polyamide based resin chips and elastomer chips are continuously or intermittently fed into separate hoppers, respectively, and material chips are quantitatively fed into an extruder in accordance with the extrusion rate of the extruder, via a buffer hopper if necessary, finally while polyamide resin chips and elastomer chips are being mixed in a hopper just before or just above the extruder (called a "final hopper") to form film.

However, depending on a capacity or shape of final hopper, when the amount of chip in the final hopper is large or when the amount of chip in the final hopper becomes small, there occurs a phenomenon of material segregation, namely, a phenomenon in which chip composition fed to an extruder from the final hopper becomes uneven. Also, such segregation phenomenon appears remarkably, in particular, when chip shape or specific gravity is different. Further, due to such segregation phenomenon, in the case of producing a long film, there occur the variations of elastic modulus in tension, pinhole resistance, maximum boiling water shrinkage, directional difference of boiling water shrinkage, film thickness and refraction index in the thickness direction.

Namely, in the presence of a difference between the size of polyamide resin chip and the size of elastomer chip, when a mixture of chips falls in a final hopper, smaller chip is apt to fall first, and when the remaining amount of chip in the final hopper reduces, the ratio of larger chip increases, which causes the chip segregation. Therefore, in order to obtain a film with less variation of physical properties, it is necessary to uniform shapes of polyamide resin chip and elastomer chip to suppress the phenomenon of material segregation in the final hopper.

Material chip of polyamide is, generally, taken out in a form of strand from polymerization equipment in the molten state after polymerization, and is immediately water-cooled; then, it is cut by a strand cutter to form. Consequently, polyamide chip is formed into an elliptic cylinder with an elliptic cross section. On the other hand, material chip of elastomer is frequently formed into a disc with an elliptic cross section. Studies on the relationship between the shape of polyamide chip as well as that of elastomer chip and material segregation indicate that the material segregation is able to be reduced by adjusting the average major axis (mm), average minor axis (mm), and average chip length (mm) of the elliptic cross-section of elastomer material chip to be within a range of ±25% relative to the average major axis (mm), average minor axis (mm) and average chip length (mm) of the polyamide based resin chip elliptic cross-section, respectively. Additionally, adjusting the average major axis, average minor axis, and average ship length of elliptical cross section of elastomer chip to be within a range of ±20% relative to the average major axis, average minor axis, and average chip length of elliptical cross section of polyamide based resin chip, respectively, produces remarkably conspicuous segregation prevention effects, which is more preferable.

(3) Reduction of Water Content in Drying Resin Chip

Chip fed into a hopper is generally heated by a machine like blender to reduce moisture therein. In drying the chip, it has been thought that the lower content in drying in production of polyester film roll or polypropylene film roll generally yields the better film roll due to suppression of hydrolysis in an extrusion step. However, the following fact has been found from the result of the studies by the present inventors: in production of polyamide based resin film roll, a mere reduction of water content in drying makes stretching difficult to yield no film roll of homogenous physical properties, but the water content is controlled within a given range to reserve some level of moisture, which leads to a suitable plasticization without being hydrolyzed in an extrusion step to thereby give a film roll with homogenous physical properties. Namely, to obtain the film roll of the present invention, it is necessary to control the water content of chip in 800 ppm or more, and 1000 ppm or less. When the water content of chip exceeds 1000 ppm, hydrolysis is advanced when melted, which lowers viscosity. Therefore, thickness irregularity of unstretched film in the longitudinal direction becomes bad and the thickness irregularity of biaxially stretched film in the longitudinal direction is increased, which causes the variation and fluctuation of physical properties. On the other hand, when the water content of chip is less than 800 ppm, viscosity when melted becomes too high, which deteriorates film forming property (ease of stretching). Additionally, most suitable water content of chip fed to a hopper is 850 ppm or more, and 950 ppm or less.

(4) Retention of Temperature in Feeding Resin to Hopper

As described above, even in the case of adjusting water content of chip to 800 ppm or more, and 1000 ppm or less, a film roll with homogenous physical properties cannot be obtained when chip after heat-drying being allowed to stand down to ambient (room) temperature is fed into a hopper. Namely, to obtain a film roll of the present invention, it is necessary to feed into a hopper while keeping the chip heat-dried by a blender etc. in high temperature. Specifically, it is necessary to feed into a hopper while keeping the chip heat-dried by a blender at 80° C. or more, it is more preferably to feed into a hopper while keeping at 90° C. or more. When the temperature of chip fed to a hopper is below 80° C., resin charging becomes bad. This causes thickness irregularity in the longitudinal direction, and variation and fluctuation of physical properties, which produces no film roll of the present invention. Additionally, in drying chip by a blender etc., drying temperature is required at 150° C. or less. When the drying temperature is above 150° C., it is not preferable because hydrolysis may occur in drying. Also, when the temperature of chip heat-dried by a blender is below 80° C., it is necessary to reheat the chip so as to be 80° C. or more before feeding it into a hopper.

(4) Optimization of Hopper Shape

It is effective for reducing material segregation that using a funnel-shaped hopper as a final hopper whose angle of slope is set to 70° or more, thereby large chip can fall easily in the same manner as small chip, and the upper part of contents goes down while keeping its horizontal plane. More preferable angle of slope is 75° or more. Additionally, angle of slope of hopper means an angle between oblique line of hopper and horizontal line segment. A plurality of hoppers may be used in the upstream of final hopper, in this case, any hopper must have an angle of slope of 70° or more, 75° or more is more preferable.

Also, reducing the ratio of fine powder formed due to shaving feedstock chip used is preferable to suppress the variation of boiling water shrinkage percentage. Since the fine powder advances feedstock segregation, it is preferable to eliminate fine powder formed in process to reduce the ratio of fine powder contained in a hopper. The ratio of fine powder contained is preferably within 1% by weight through the entire steps before feedstock chip enters into an extruder, more preferably within 0.5% by weight. As a specific method for reducing the ratio of fine powder, there can be listed a method of sieving in chip forming step by a strand cutter or passing through a cyclone type air filter in transporting feedstock chip with air.

(5) Addition of Segregation Inhibitor in Mixing Resin

Furthermore, as a means for reducing material segregation in a hopper, it is preferable to add a sublimation segregation inhibitor in mixing polyamide based resin and elastomer in the hopper. As such sublimation segregation inhibitor, low-boiling point glycols are able to be used, and of all, polyoxyethylene polyoxypropylene glycol can be suitably used. In addition, the amount of sublimation segregation inhibitor to be added to material chip of polyamide based resin and material chip of elastomer is preferably in the range of 0.02% to 2.00% with respect to the total weight of polyamide based resin and elastomer. In the case of less than 0.02%, satisfactory segregation prevention effect is unable to be obtained, which is not preferable, and on the contrary, in the case of 2.00% or more, the inhibitor may not be completely sublimed, which is not preferable, either.

In addition, as a means for reducing material segregation in a hopper, it is a preferable means to optimize the capacity of a hopper to be used. Here, the optimum capacity of hopper is in a range of 15-120% by weight relative to the extrusion amount per one hour of extruder, more preferable is in a range of 20-100% by weight relative to the extrusion amount per one hour of extruder.

As a method for blending material chips of polyamide and material chips of elastomer, it is possible to feed into a final hopper and extruder via several intermediate hoppers (buffer hoppers) for mixing.

In blending a plurality of material as polyamide based resin and elastomer, there can be listed a method of blending while quantitatively feeding the plurality of materials continuously from an apparatus that continuously feeds a constant amount of material chip into a hopper, or a method of blending beforehand using a blender or a paddle drier, but in the case of adopting the latter, it is preferable to reduce the size of material chips with care to prevent material segregation from occurring at the time of discharging the mixture.

(6) Removal of Detrimental Effects by Adding Segregation Inhibitor (Suction for Contacting Melted Resin with Metal Rolls)

In obtaining an unstretched film by melt extrusion of chip, chip is melted by an extruder at 200-300° C., and extruded through a T-die to form a film (sheet), i.e., by casting, then quenched by a method of wrapping melted resin around a cooling roll such as metal roll being cooled at a predetermined temperature. Additionally, from the points of thickness irregularity in the longitudinal direction, and variation and fluctuation of physical properties, preferable temperature of melt extrusion is 240° C. to 290° C. To obtain a film roll of the present invention, in the case of winding melted resin on a metal roll, it is preferable to force the melted resin to contact a metal roll by the following manner: air gap (namely, a distance between the exit of T-die lip and a surface of chilling roll in the vertical direction) is adjusted to 20-60 mm, and the part contacting the melted resin with the surface of cooling roll is sucked over the entire width of melted resin in the opposite direction to the winding direction by utilizing a suction unit such as vacuum box (vacuum chamber) having a wide suction inlet.

Also, in such event, in order to prevent the sublimation segregation inhibitor from blocking melted resin from adhering to the cooling roll, the wind velocity of suction air in the suction inlet must be adjusted to 2.0-7.0 m/sec., and it is more preferably adjusted to 2.5-5.5 m/sec. Further, vacuum box may have a single suction inlet, and it is preferable that the suction inlet divided into a predetermined number of sections in the lateral direction can adjust the wind velocity of suction in each section to make the adjustment of wind velocity of suction easy in the suction inlet. Also, when the casting speed increases, accompanying stream takes place according to the rotation of metal roll, which disturbs close contact of melted resin with a metal roll, thus to make suction more effective by a suction unit, and to improve close contact of melted resin with the metal roll, it is preferable to shield the accompanying stream by equipping a masking shield of flexible material like Teflon (registered trademark) being formed in broad range in the upstream adjacent to the suction unit (the opposite side to the rotation direction of metal roll relative to the suction unit). Further, to obtain a film roll of the present invention, fluctuation of wind velocity of suction in a vacuum box is required to be suppressed within ±20% to the average wind velocity of suction (set value), more preferably suppressed within ±10%. In addition, to prevent wind velocity of suction in a vacuum box from variation due to oligomer dust etc., it is preferable to adjust suction power by equipping a filter in a vacuum box and feed back the differential pressure across the filter.

Also, to obtain a film roll of the present invention, in the case of winding melted resin on a cooling roll, it is necessary to quench continuously by close contact on the metal roll while glow discharging by impressing the melted resin sheet with a needle electrode in a direct current negative charge of 90-105 mA at 2-15 kv. Additionally, in this case, it is preferable to adjust the direct current negative charge impressed in a range of 7-14 kv because thickness irregularity in the longitudinal direction, and variation and fluctuation of physical properties are lowered. Also, to obtain a film roll of the present invention, the fluctuation of direct current negative charge impressed must be suppressed within ±20% to the average negative charge (set value), it is more preferably suppressed within ±10%.

(7) Suitable Stretching Condition

As a method of biaxially stretching an unstretched film, it is necessary to adopt a longitudinal and transverse stretching method that an unstretched film is stretched by a roll-type stretching machine in the longitudinal direction, stretched by a tenter-type stretching machine in the transverse direction, then thermally fixed and relaxed. Further, to obtain a film roll of the present invention, as a method of biaxial stretching, it needs to adopt so called longitudinal-longitudinal-transverse stretching method. Such the longitudinal-longitudinal-transverse stretching method is the following method: in longitudinal-stretching of an essentially unoriented polyamide film, the first-stage stretching is conducted, without cooling at Tg or less, and continuously the second-stage stretching is conducted, and then transverse stretching is conducted in a ratio of 3.0 times or more, preferable 3.5 times or more, and further thermally fixed. Moreover, to obtain a film roll of the present invention, in conducting the longitudinal-longitudinal-transverse stretching described above, a longitudinal stretching ratio in the first stage must be higher than a longitudinal stretching ratio in the second stage. Namely, by setting a longitudinal stretching ratio in the first stage higher than a longitudinal stretching ratio in the second stage, it becomes possible to obtain a film roll having excellent physical properties such as boiling water shrinkage percentage and less fluctuation of these physical properties. Additionally, in the case of conducting the longitudinal-longitudinal-transverse stretching, generally, when a longitudinal stretching ratio in the first stage is lower than a longitudinal stretching ratio in the second stage, stretching is easily carried out without adhesion on a roll in the first stage. On the other hand, even when a longitudinal stretching ratio in the first stage is higher than a longitudinal stretching ratio in the second stage, stretching can be easily carried out without adhesion on a roll by using a special roll such as roll made of Teflon (trademark).

In the case of conducting the longitudinal-longitudinal-transverse stretching described above, it is preferable that a longitudinal stretching in the first stage is carried out in a temperature of 80-90° C. and a ratio of about 2.0-2.4 times. It is not preferable that the stretching ratio in the first stage is high beyond the foregoing range because thickness irregularity in the longitudinal direction becomes large. In addition thereto, it is preferable that a longitudinal stretching in the second stage is carried out in a temperature of 65-75° C. and a ratio of about 1.3-1.7 times. It is not preferable that the stretching ratio in the second stage is low beyond the foregoing range because distortion in boiling is too large to have a practical use. Reversely, it is not preferable that the stretching ratio in the second stage is high beyond the foregoing range because strength (strength at 5% extension) in the longitudinal direction is too low to have a practical use.

Also, in the case of conducting the longitudinal-longitudinal-transverse stretching described above, a longitudinal stretching method can employ a heated roll stretching or an infrared radiation stretching. Also, in the case where a polyamide based resin film is produced by such longitudinal-longitudinal-transverse stretching method, it is possible to reduce not only thickness irregularity, the variation and fluctuation of physical properties in the longitudinal direction but also the variation and fluctuation of physical properties in the transverse direction. Also, in the case of conducting the longitudinal-longitudinal-transverse stretching, the total longitudinal stretching condition is preferably 3.0 to 4.5 times.

Also, in the case of conducting the longitudinal-longitudinal-transverse stretching, it is preferable that transverse stretching is carried out in a temperature of 120-140° C. and a ratio of about 4.0-5.5 times. It is not preferable that the transverse stretching ratio is low beyond the foregoing range because strength (strength at 5% extension) in the transverse direction is too low to have a practical use, reversely, it is not preferable that the transverse stretching ratio is high beyond the foregoing range because thermal shrinkage in the transverse direction becomes high. Moreover, it is not preferable that temperature in transverse stretching is low beyond the foregoing range because distortion in boiling is too large to have a practical use, reversely, it is not preferable that temperature in transverse stretching is high beyond the foregoing range because strength (strength at 5% extension) in the transverse direction is too low to have a practical use.

Further, to obtain a film roll of the present invention, thermal fixation treatment after the longitudinal-longitudinal-transverse stretching is preferably conducted in a temperature of 180-230° C. When the temperature in the thermal fixation treatment is low beyond the foregoing range, it is not preferable because thermal shrinkage in the longitudinal direction and transverse direction is large, and reversely, when the temperature in the thermal fixation treatment is high beyond the foregoing range, it is not preferable because impact strength of biaxially stretched film becomes low.

In addition, to obtain a film roll of the present invention, relaxation treatment after thermal fixation is preferably carried out in a relaxation of 2-10%. When the relaxation treatment ratio is low beyond the foregoing range, it is not preferable because thermal shrinkage in the longitudinal direction and transverse direction becomes large, and reversely, when the relaxation treatment ratio is high beyond the foregoing range, it is not preferable because strength (strength at 5% extension) in the longitudinal direction and the width direction is too low to have a practical use.

Also, width of film roll is not particularly limited, but the lower limit of width of film roll is preferably 0.35 m or more from the point of easy handling, more preferably 0.50 m or more. On the other hand, the upper limit of width of film roll is preferably 2.5 m or less, more preferably 2.0 m or less, and further preferably 1.5 m or less. In addition, winding length is also not particularly limited, but the lower limit of winding length of film roll is preferably 500 m or more from the points of easy winding and easy handling, more preferably 1000 m or more. On the other hand, the upper limit of winding length of film roll is preferably 25000 m or less, more preferably 20000 m or less, and further preferably 15000 m or less. Additionally, in the case of film thickness of about 15 µm, 12000 m or less is particularly preferable. Also, a winding core can ordinarily employ a paper, plastic or metal core with 3 inches (7.62 cm), 6 inches, 8 inches and the like.

EXAMPLES

Moreover, thickness of film composing polyamide based film roll is also not particularly limited, for example, as a polyamide based film for packaging, 8-50 µm is preferable, 10-30 µm is further preferable.

In addition, polyamide based resin film composing a film roll of the present invention can contain various kinds of additives, within the range that the characteristics are not damaged, such as lubricant, anti-blocking agent, thermal stabilizer, antioxidant, antistatic agent, light resistant agent and impact modifier. In particular, it is preferable to contain various kinds of inorganic particles so as to improve lubrication of biaxially stretched film. In addition, as an inorganic particle, one with an average diameter of particle (i.e., average particle diameter) of 0.5-5.0 µm is preferable, and silica particle is particularly preferable. When the average particle diameter is below 0.5 µm, no good lubrication can be obtained, whereas when the average particle diameter is above 5 µm, it is not preferable because transparency become poor and so called strike through on printing occurs. Additionally, the average particle diameter can be measured by employing a method in which a weight-average diameter can be calculated from a particle distribution obtained by a coalter counter, it can be determined from the measurement of particles before addition to polyamide resin, and also can be determined from the measurement of particle separated by dissolving polyamide based resin film in acid. Also, an organic lubricant such as ethylene-bis-stearic acid exhibiting the effect of lowering surface energy is preferably added because lubrication of film composing a film roll becomes excellent.

Further, polyamide based resin film composing a film roll of the present invention can be subjected to thermal treatment or humidity adjusting treatment to improve the dimensional stability according to the applications. In addition, it can be provided with corona treatment, coating treatment or flame treatment to give better adhesion of film surface, and also processed by printing, deposition or the like.

Additionally, any particular one of the above-described measures (1) to (6) alone does not contribute to the reduction of variation in the physical properties of film roll, and we are considering that, by using a combination of measures (1) to (6), the variation in the physical properties of film roll can be very efficiently reduced.

EXAMPLES

The present invention will be described in detail with reference to Examples below; the present invention is not limited to the aspects of Examples and can be suitably modified to the extent not departing from the spirit of the present invention. Tables 1 and 2 each show features of material chips A to H used in Examples and Comparative examples; compositions of material chips used in Examples and Comparative examples; and film forming conditions of film rolls in Examples and Comparative examples. Additionally, chips A consists of 99.70% by weight of nylon 6 (relative viscosity=2.8, Tg=41° C.) and 0.30% by weight of silica particle; and chips B and H consist of 99.85% by weight of copolymer (relative viscosity=2.0) of nylon 12 and PTMG (polytetramethylene glycol) and 0.15% by weight of ethylene bisstearic acid amide, chip C consists of 99.85% by weight of copolymer (relative viscosity=2.4) of nylon 6 and PEG (polyethylene glycol) and 0.15% by weight of ethylene bisstearic acid amide, chip D consists of 99.85% by weight of ethylene methacrylic acid copolymer (MFR (Melt Flow Rate) at 190° C.=2.4 g/10 minutes) and 0.15% by weight of ethylene bisstearic acid amide, chip E consists of 99.85% by weight of ethylene butene copolymer (MFR=2.0 g/10 minutes) and 0.15% by weight of ethylene bisstearic acid amide, chip F consists of 99.85% by weight of ethylene based ionomer (MFR=2.4 g/10 m minutes) and 0.15% by weight of ethylene bisstearic acid amide, and chip G consists of 99.85% by weight of styrene butadiene copolymer (MFR=2.8 g/10 minutes) and 0.15% by weight of ethylene bisstearic acid amide. Furthermore, the silica particle added to chip A has an average particle size of about 3.0 µm. In addition, the shapes of chips A through H are all elliptic cylinders, while chips B through G have identical cross sectional major axis, cross sectional minor axis, and chip length.

TABLE 1

| | Composition of resin, etc. | Commercial name of resin | Lubricant (silica) Particle size (μm) | Lubricant (silica) Amount added (wt %) | Shape (average: mm) Major axis of cross section | Shape (average: mm) Minor axis of cross section | Chip length | Relative viscosity | MFR (190° C.) (g/10 min) |
|---|---|---|---|---|---|---|---|---|---|
| Chip A | Nylon 6 | Nylon available from TOYOBO | 3.0 | 0.3 | 2.4 | 2.2 | 2.1 | 2.8 | — |
| Chip B | Nylon 12/PTMG copolymer | DA330 available from TOYOBO | — | — | 2.5 | 2.2 | 2.2 | 2.0 | — |
| Chip C | Nylon 6/PEG copolymer | Pebax MH1657 available from ARKEMA | — | — | 2.5 | 2.2 | 2.2 | 2.4 | — |
| Chip D | Ethylene methacrylic acid copolymer | Nucrel NO502 available from Du Pont-Mitsui Polychemical | — | — | 2.5 | 2.2 | 2.2 | — | 2.4 |
| Chip E | Ethylene butene copolymer | TAFMER A4085 available from Mitsui Chemicals | — | — | 2.5 | 2.2 | 2.2 | — | 2.0 |
| Chip F | Ethylene based ionomer | HIMILAN available from Du Pont-Mitsui Polychemical | — | — | 2.5 | 2.2 | 2.2 | — | 2.4 |
| Chip G | Styrene butadiene copolymer | TR2003 available from JSR | — | — | 2.5 | 2.2 | 2.2 | — | 2.8 |
| Chip H | Nylon 12/PTMG copolymer | Pebax 4033 available from ARKEMA | — | — | 4.5 | 2.2 | 2.8 | 2.0 | — |

TABLE 2

| | Mixing ratio of material chips (% by weight) | Amount of lubricant added (parts by weight) | Amount of segregation inhibitor added (ppm) | Angle of slope of hopper (degree) | Water content of chip (ppm) | Wind velocity of suction in vacuum box (m/min.) | Temperature of chip fed to hopper (° C.) | First longitudinal stretching Temperature (° C.) | First longitudinal stretching Ratio | Second longitudinal stretching Temperature (° C.) | Second longitudinal stretching Ratio | Third longitudinal stretching Temperature (° C.) | Third longitudinal stretching Ratio | Thermal fixation (° C.) | Relaxation treatment (%) |
|---|---|---|---|---|---|---|---|---|---|---|---|---|---|---|---|
| Example 1 | A/B = 97/3 | 0.15 | 1000 | 70 | 800 | 5.0 ± 0.5 | 91 | 85 | 2.1 | 70 | 1.5 | 130 | 4.0 | 210 | 5.0 |
| Example 2 | A/B = 97/3 | 0.15 | 1000 | 70 | 800 | 5.0 ± 0.5 | 91 | 90 | 2.2 | 70 | 1.5 | 130 | 4.0 | 210 | 5.0 |
| Example 3 | A/B = 90/10 | 0.15 | 1000 | 70 | 800 | 5.0 ± 0.5 | 91 | 90 | 2.2 | 70 | 1.5 | 130 | 4.0 | 210 | 5.0 |
| Example 4 | A/C = 95/5 | 0.15 | 1000 | 70 | 800 | 5.0 ± 0.5 | 91 | 90 | 2.2 | 70 | 1.5 | 130 | 4.0 | 210 | 5.0 |
| Example 5 | A/D = 95/5 | 0.15 | 1000 | 70 | 800 | 5.0 ± 0.5 | 91 | 90 | 2.2 | 70 | 1.5 | 130 | 4.0 | 210 | 5.0 |
| Example 6 | A/E = 95/5 | 0.15 | 1000 | 70 | 800 | 5.0 ± 0.5 | 91 | 90 | 2.2 | 70 | 1.5 | 130 | 4.0 | 210 | 5.0 |
| Example 7 | A/F = 95/5 | 0.15 | 1000 | 70 | 800 | 5.0 ± 0.5 | 91 | 90 | 2.2 | 70 | 1.5 | 130 | 4.0 | 210 | 5.0 |
| Example 8 | A/G = 95/5 | 0.15 | 1000 | 70 | 800 | 5.0 ± 0.5 | 91 | 90 | 2.2 | 70 | 1.5 | 130 | 4.0 | 210 | 5.0 |
| Comparative example 1 | A = 100 | 0.15 | 1000 | 70 | 800 | 5.0 ± 0.5 | 91 | 90 | 2.2 | 70 | 1.5 | 130 | 4.0 | 210 | 5.0 |
| Comparative example 2 | A/B = 95/5 | 0.15 | 1000 | 70 | 1500 | 5.0 ± 0.5 | 85 | 90 | 2.2 | 70 | 1.5 | 130 | 4.0 | 210 | 5.0 |
| Comparative example 3 | A/B = 95/5 | 0.15 | 1000 | 70 | 800 | 5.0 ± 0.5 | 30 | 90 | 2.2 | 70 | 1.5 | 130 | 4.0 | 210 | 5.0 |
| Comparative example 4 | A/B = 95/5 | 0.15 | 1000 | 45 | 800 | 5.0 ± 0.5 | 91 | 90 | 2.2 | 70 | 1.5 | 130 | 4.0 | 210 | 5.0 |
| Comparative example 5 | A/B = 95/5 | 0.15 | 0 | 70 | 800 | 5.0 ± 0.5 | 91 | 90 | 2.2 | 70 | 1.5 | 130 | 4.0 | 210 | 5.0 |
| Comparative example 6 | A/H = 95/5 | 0.15 | 1000 | 70 | 800 | 5.0 ± 0.5 | 91 | 90 | 2.2 | 70 | 1.5 | 130 | 4.0 | 210 | 5.0 |

Example 1

The above-mentioned chip A was pre-dried while heating at about 120° C. for about 8.0 hours using a blender apparatus of 15 kL. In the mean time, the above-mentioned chip B was pre-dried while heating at about 80° C. for about 8.0 hours using a separate blender apparatus of 15 kL. Each chip was sampled from the blenders by a predetermined amount and its water content was measured to find that both chips A and B provided 800 ppm of water content. Additionally, the water content was measured under the conditions of sample weight of 1 g and sample heating temperature of 230° C. using a Karl Fisher moisture meter (MKC-210 available from KYOTO Electronics Corp.).

Then, chips in each blender after pre-drying were separately supplied continuously to a blending mixer by a quantitative screw feeder. Additionally, the amount of supplied chip A was set to 97.0% by weight and the feedrate of chip B was set to 3.0% by weight. In addition, in the hopper to which chip A and chip B were supplied, ethylene bisstearic acid amide (LIGHT AMIDE WE-183 available from Kyoeisha Chemical) were added as lubricant at a ratio of 1.5 (0.15 parts by weight) to 1000 of total weight of chip A and chip B. Furthermore, as a sublimation segregation inhibitor, polyoxyethylene polyoxypropylene glycol (NEWPOL PE-64 available from Sanyo Chemical Industry) were added in such a manner that the polyoxyethylene polyoxypropylene glycol attains a concentration of 1000 ppm to the total weight of Chip A and Chip B.

Thereafter, the mixed material of Chip A and Chip B blended in the blending mixer as described above was continuously supplied to a hopper just above an extruder. The hopper has a capacity to contain 150 kg of material chips and the discharge rate of the extruder was 450 kg per hour. In addition, the angle of slope of hopper was adjusted to 70°. Additionally, in Example 1, the average major axis, average minor axis, and average chip length of elastomer chip (Chip B) are all included within a range of ±20%, respectively, with respect to the average major axis, average minor axis, and average chip length of polyamide based resin chip (Chip A) which were used in the greatest quantity.

Also, on feeding chips A and B into a hopper, the chips were fed in a short period of time from drying to the hopper so that the temperature of chip in each blender did not become too low. The temperature of both chips A and B just before being fed into the hopper was about 91° C. Then, the chips A and B fed were blended in the hopper, melt-extruded through a T-die at 270° C. from a single screw type extruder, wound on a rotating metal roll chilled at 17° C. for quenching to give an unstretched film having a thickness of 257 μm. Additionally, take-up speed of unstretched film (rotational speed of metal roll) was about 60 m/min.

Also, air gap in winding melted resin on a metal roll was adjusted to 40 mm, by impressing a direct current negative charge of 100 mA at 11±1.1 kv with a needle electrode to yield glow discharge, melted resin was electrostatically attached closely on the metal roll. Further, in winding melted resin on a metal roll, the part contacting the melted resin with the metal roll was sucked over the entire width of melted resin using a vacuum box in the opposite direction to the direction of winding the resin to advance close contact of the melted resin on the metal roll. Additionally, the wind velocity of suction in the vacuum box was adjusted to be 5.0±0.5 m/sec. over the entire width of suction inlet (i.e., entire width of melted resin).

Thereafter, the obtained unstretched film was longitudinally stretched (first longitudinal stretching) at stretching temperature of about 85° C. and about 2.1 times by a Teflon (trademark) roll, and it was then longitudinally stretched (second longitudinal stretching) at stretching temperature of about 70° C. and about 1.5 times by a ceramic roll. Further, the longitudinal stretching sheet was continuously led to a tenter, transversely stretched at about 130° C. and 4.0 times, thermally fixed at about 210° C., subjected to transverse relaxation treatment of 5.0%, and then cooled, and by cutting the both edge parts to eliminate, a biaxially stretched film of about 15 μm and 2000 m or more was formed continuously to produce a mill roll. Additionally, the variation range of film surface temperature when a film was produced continuously in 2000 m was within ±0.8° C. to the average temperature in the pre-heating step, ±0.6° C. to the average temperature in the stretching step and ±0.5° C. to the average temperature in the thermal treatment step. Further, the obtained mill roll was slit into 400 mm in width and 2000 m in length, and wound up on a 3-inch paper tube to obtain two polyamide based mixed resin film rolls (slit rolls). Then, using the two slit rolls thus obtained (namely, obtained from the same mill roll), characteristics were evaluated in the following methods. Additionally, for the following measurements of elastomer component content, elastic modulus in tension, pinhole resistance, BS (boiling water shrinkage percentage), BSx (maximum boiling water shrinkage percentage), BSd (directional difference of boiling water shrinkage percentage) and refraction index, sample films were prepared as follows: a first sample cutout portion was set up within 2 m from the winding end of film, sample cutout portions from a second to 20th were set up in approximately every 100 m from the first sample cutout portion, a 21st cutout portion was set up within 2 m from the winding start of film, and sample films were cut out from each of cutout portions from the first to the 21st. The evaluation results are shown in Tables 3 to 9. In showing the evaluation results, an average of values of each sample measured and variation range of values of each sample are shown for impact strength and laminate strength. Also, regarding the S-shaped curl, the number of samples determined in each evaluation level and the comprehensive evaluation level of all samples are shown.

[Elastomer Component Content]

Polyamide based mixed resin film was cut perpendicular to the surface and perpendicular to the winding-up direction and a super-thin section was prepared, dyed with phosphotungstic acid and ruthenium oxide by a super-thin section method to prepare samples. Thereafter, samples were observed at X10000 magnification by JEOL transmission electron microscope (JEM2010) and electron micrographs (about 160 mm in thickness direction×about 220 mm in winding direction) were taken. And by the use of a JEOL image processing device (analysis), the ratio of elastomer portions dyed by phosphotungstic acid and ruthenium oxide to the whole area was computed as the content of elastomer component.

The polyamide based mixed resin film was sampled in a size 150 mm long and 15 mm wide, and the sample was humidity-conditioned for 24 hours under an atmosphere of 23° C. temperature and 50% relative humidity. And under the conditions of 23° C. temperature and 50% relative humidity, in conformity to JIS K-7217 and using Shimadzu Autograph AG-100E, the humidity-conditioned film was gripped by chucks with 100 mm distance apart and pulled at a pulling rate of 200 mm/min, and the ratio of tensile stress in the tensile proportional limit to strain that corresponds to this was computed as the elastic modulus in tension.

[Boiling Water Shrinkage Percentage]

A biaxially oriented polyamide based resin film (sample film) cut out from each of cutout portions of one slit roll was cut out in a square with a side of 21 cm, allowed to stand in an atmosphere of 23° C. and 65RH % for two hours or more. A circle of about 20 cm in diameter centered on this sample was drawn, a longitudinal direction (direction of film drawn out) was set to be 0°, liner lines passing to the center of circle were clockwise drawn at intervals of 15° in the direction of 0 to 165°, and diameter in each direction was measured as the length before treatment. Then, after the sample cut out was thermally treated in boiling water for 30 minutes, it was brought back and water attached on the surface was wiped out, dried in air, allowed to stand in an atmosphere of 23° C. and 65% RH for 2 hours or more, as described above, and the length of linear line drawn to each diametrical direction was measured as the length after treatment. Then, according to the foregoing formulas 1 to 5, the following values were measured, which were, the BS (boiling water shrinkage percentage), BSx (maximum boiling water shrinkage percentage), BSax (average boiling water shrinkage percentage), BSd (directional difference of boiling water shrinkage percentage) and BSad (average directional difference of boiling water shrinkage percentage).

Thereafter, the maximum and the minimum of the maximum boiling water shrinkage percentage (BSx) of all samples were obtained, a larger difference between either the maximum or the minimum and the average boiling water shrinkage percentage (BSax) was calculated, a ratio of which relative to the average boiling water shrinkage percentage (BSax) was calculated, and thereby a degree of variability in the maximum boiling water shrinkage percentage (BSx) relative to the average boiling water shrinkage percentage (BSax) was obtained. Also, the maximum and the minimum of the directional difference of boiling water shrinkage percentage (BSd) of all samples were obtained, a larger difference between either the maximum or the minimum and the average directional difference of boiling water shrinkage percentage (BSad) was calculated, a ratio of which relative to the average directional difference of boiling water shrinkage percentage (BSad) was calculated, and thereby a degree of variability in the directional difference of boiling water shrinkage percentage (BSd) relative to the average directional difference of boiling water shrinkage percentage (BSad) was obtained.

[Thickness Irregularity in the Longitudinal Direction]

A slit roll for measurement of thickness irregularity was prepared by slitting a slit roll in about 3 cm width over the entire length in the longitudinal direction. Then, the average thickness, the maximum thickness and the minimum thickness were obtained over the entire length in the longitudinal direction using a thickness irregularity measuring apparatus (wide range high sensitive electronic micrometer K-313A) manufactured by Anritsu Corp. Thereafter, from the following formula 7, a degree of variability in thickness over the entire length in the longitudinal direction was calculated as follows: a larger difference between either the maximum thickness or the minimum thickness and the average thickness was calculated, a ratio of which relative to the average thickness was calculated to give the degree of variability in thickness over the entire length in the longitudinal direction.

Degree of variability in thickness=|maximum thickness or minimum thickness−average thickness|/average thickness    7

[Refraction Index]

Using an "Abbe refractometer 4T type" manufactured by Atago Co., Ltd, each sample film cut out from each of cutout portions was allowed to stand in an atmosphere of 23° C. and 65RH % for 2 hours or more, then refraction index in the thickness direction (Nz) was measured. Also, the average refraction index of all samples was calculated, as shown in Table 6, the difference between either the maximum or the minimum of Nz in all samples and the average refraction index was calculated and a ratio of which relative to the average refraction index was calculated as a degree of variability.

[Impact Strength]

Each sample film cut out from each of cutout portions was allowed to stand in an atmosphere of 23° C. and 65RH % for 2 hours or more, then breaking strength was measured using a "Film impact tester TSS type" manufactured by Toyo Seiki Seisaku-Sho, Ltd. with hemispheric collision ball of 12.7 mm in diameter, and the strength was defined as impact strength. The average impact strength of all sample films was also calculated.

[Lamination Processability]

Using another slit roll (obtained from the same mill roll) different from a slit roll by which the above-described boiling water shrinkage percentage, thickness irregularity in the longitudinal direction, refraction index and impact strength were measured, a laminated film roll with a three layer laminated structure consisting of polyamide based resin/LDPE/LLDPE was obtained as follows: to a biaxially oriented polyamide resin film composing the slit roll, urethane based AC agent ("1L443" manufactured by Toyo-Morton, Ltd.) was coated, and then, on which LDPE (low density polyethylene) film of 15 μm in thickness was continuously extruded at 315° C. using a single test laminator apparatus manufactured by Modern Machinery Ltd., and further LLDPE (linear low density polyethylene) film of 40 μm in thickness was continuously laminated thereon. Also, processability in producing a laminated film roll was evaluated as the following three levels.

○: no wrinkle of roll occurs, so no need in adjustment of condition

Δ: wrinkle of roll eliminated by adjustment of condition x: wrinkle of roll still occurs in spite of any adjustment of condition

[Laminate Strength]

Also, a laminate film cut out from the laminate film roll was cut out in 15 mm wide and 200 mm long as a sample piece, and peel strength between polyamide based mixed resin film layer and LDPE layer was measured under the conditions of temperature of 23° C. and relative humidity of 65% using "Tensiron UMT-II-500 type" available from Toyo Boldwin Co. Ltd. Additionally, pulling rate was 10 cm/min., peeling angle was 180 degree, and the measurement was carried out with a peeling part immersed in water. Also, in the measurement of laminate strength, a first sample piece was cut out within 2 m from the winding end of laminate film roll, sample pieces of a second to 19th were cut out in approximately every 100 m from the first sample cutout portion, a 20th sample piece was cut out within 2 m from the winding start of film, and each sample piece from the first to the 20th was measured. The average of the measurements was also calculated.

[S-Shaped Curl Phenomenon]

As described above, the laminate film wound up as a laminate film roll was folded into two in parallel with the winding length direction while continuously conducting heat-sealing on each of both edges in 20 mm at 150° C. in the longitudinal direction using a test sealer available from Nishibe Kikai Co. Ltd. Then, the film was intermittently heat-sealed at intervals of 150 mm in 10 mm in the perpendicular direction thereto to obtain a half-finished product with width of 200 mm. This product was cut in the winding length direction so that both edges have a sealed part of 10 mm, then cut at the boundary of the sealed part in the perpendicular direction thereto, and thereby to prepare a three-edge sealed bag (seal width: 10 mm). Of the three-edge sealed bags, the three-edge sealed bag prepared from the portion within 2 m from winding end of laminate film roll was selected as a first sample, and the three-edge sealed bags prepared from the portions being about 100, 200, . . . 1800, 1900 m apart from the prepared portion of the first sample were selected as a second to 20th sample, respectively, and the three-edge sealed bag prepared from the portion within 2 m from winding start of laminate film roll was selected as a 21st sample. Thereafter, these twenty-one three-edge sealed bags were thermally treated in boiling water for 30 minutes, then allowed to stand in an atmosphere of 23° C. and 65% RH overnight, and further, the twenty-one three-edge sealed bags were overlapped, and 1 kg load was applied on the entire surface of bag from above, being kept overnight, and followed by removing the load. The degree of warpage of bag (S-shaped curl) was evaluated as follows.

⊚: no warpage at all

○: warpage is slightly observed x: warpage is apparently observed x x: remarkable warpage

[Pinhole Resistance]

A laminate film cut out from the above-mentioned laminate film roll was cut into a size of 20.3 cm (8 inch) by 27.9 cm (11 inch), and the rectangular test film (laminate film) after cutting was allowed to stand at 23° C. temperature and 50% relative humidity for at least 24 hours for conditioning. Thereafter, the rectangular test film was wound into a cylindrical shape 20.32 cm (8 inch) of length. And one end of the cylindrical film was fixed to the outer circumference of a disk-shape fixed head of the Gelvo type Flex-Cracking Tester (Model No. 901 available from Rigaku Corporation which complies with the MIL-B-131C standard), and the other end of the cylindrical film was fixed to the outer circumference of a disk-shape mobile head of tester which is opposite to the fixed head at a distance of 17.8 cm (7 inch). The mobile head is rotated at 440° while it is being brought closer by 7.6 cm (3.5 inch) in the fixed head direction along the axes of both heads opposite in parallel, and then, is allowed to go straight ahead by 6.4 cm (2.5 inch) without rotating; then, these operations are reversely performed to return the mobile head to the original position. This constitutes one cycle of bend test. The bend test is continuously repeated at 40 cycles per minute by 3000 cycles. Thereafter, the number of pinholes generated at a portion of 17.8 cm (7 inch)×27.9 cm (11 inch) is counted, with the portions of the outer circumferences of the tested film excluded, to which the fixed head and the mobile head are fixed (that is, the number of pinholes per 497 cm$^2$ (77 square inch) was counted).

Example 2

An unstretched film obtained in the same manner as in Example 1 was longitudinally stretched (first longitudinal stretching) in stretching temperature of about 90° C. and about 2.2 times by a Teflon (trademark) roll, and then longitudinally stretched (second longitudinal stretching) in stretching temperature of about 70° C. and about 1.5 times by a ceramic roll. Further, in the same manner as in Example 1, the longitudinally stretched sheet was continuously led to a stenter, and transversely stretched at about 130° C. and 4.0 times. Then, it was thermally fixed at about 210° C., subjected to transverse relaxation treatment of 5.0%, and cooled. Then, by cutting the both edge parts to eliminate, a biaxially stretched film of about 15 μm and 2000 m or more continuously was formed. Additionally, the variation range of film surface temperature when the film was continuously produced was within ranges of ±0.8° C. of average temperature for preheating step, ±0.6° C. of average temperature for stretching step and ±0.5° C. of average temperature for heat processing step the same as in Example 1. The obtained film was slit and wound up in the same manner as in Example 1, to obtain polyamide based mixed resin film rolls in Example 2. Then, the characteristics of the obtained film were evaluated in the same methods as in Example 1. The evaluation results are shown in Tables 3 to 9.

Example 3

A polyamide based mixed resin film roll in Example 3 was obtained in the same manner as in Example 2 except that the mixing ratio of material chip A to material chip B was set chip A to 90.0% by weight and weight chip B to 10.0% by. Additionally, in also Example 3, the average major axis, average minor axis, and average chip length of elastomer chip (chip B) were included within a range of ±20%, respectively, with respect to the average major axis, average minor axis, and average chip length of polyamide based resin chip (chip A). And the characteristics of the obtained film were evaluated by the method same as that of Example 1. The evaluation results are shown in Tables 3 to 9.

Example 4

A polyamide based mixed resin film roll in Example 4 was obtained in the same manner as in Example 2 except that material chip C was used in place of material chip B and the mixing ratio of material chip A to material chip C was set chip A to 95.0% by weight and chip C to 5.0% by weight. Additionally, in also Example 4, the average major axis, average minor axis, and average chip length of elastomer chip (chip C) were included within a range of ±20%, respectively, with respect to the average major axis, average minor axis, and average chip length of polyamide based resin chip (chip A). Then, the characteristics of the obtained film were evaluated by the method same as that of Example 1. The evaluation results are shown in Tables 3 to 9.

Example 5

A polyamide based mixed resin film roll in Example 5 was obtained in the same manner as in Example 2 except that material chip D was used in place of material chip B and the mixing ratio of material chip A to material chip D was set chip A to 95.0% by weight and chip D to 5.0% by weight. Additionally, in also Example 5, the average major axis, average minor axis, and average chip length of elastomer chip (chip D) were included within a range of ±20%, respectively, with respect to the average major axis, average minor axis, and average chip length of polyamide based resin chip (chip A). Then, the characteristics of the obtained film were evaluated by the method same as that of Example 1. The evaluation results are shown in Tables 3 to 9.

Example 6

A polyamide based mixed resin film roll in Example 6 was obtained in the same manner as in Example 2 except that material chip E was used in place of material chip B and the mixing ratio of material chip A to material chip E was set chip A to 95.0% by weight and chip E to 5.0% by weight. Additionally, in Example 6, too, the average major axis, average minor axis, and average chip length of elastomer chip (chip E) were included within a range of ±20%, respectively, with respect to the average major axis, average minor axis, and average chip length of polyamide based resin chip (chip A). Then, the characteristics of the obtained film were evaluated by the method same as that of Example 1. The evaluation results are shown in Tables 3 to 9.

Example 7

A polyamide based mixed resin film roll in Example 7 was obtained in the same manner as in Example 2 except that material chip F was used in place of material chip B and the mixing ratio of material chip A to material chip F was set chip A to 95.0% by weight and chip F to 5.0% by weight. Additionally, in also Example 7, the average major axis, average minor axis, and average chip length of elastomer chip (chip F) were included within a range of ±20%, respectively, with respect to the average major axis, average minor axis, and average chip length of polyamide based resin chip (chip A). Then, the characteristics of the obtained film were evaluated by the method same as that of Example 1. The evaluation results are shown in Tables 3 to 9.

Example 8

A polyamide based mixed resin film roll in Example 8 was obtained in the same manner as in Example 2 except that material chip G was used in place of material chip B and the mixing ratio of material chip A to material chip G was set chip A to 95.0% by weight and chip G to 5.0% by weight. Additionally, in also Example 8, the average major axis, average minor axis, and average chip length of elastomer chip (chip G) were included within a range of ±20%, respectively, with respect to the average major axis, average minor axis, and average chip length of polyamide based resin chip (chip A). Then, the characteristics of the obtained film were evaluated by the method same as that of Example 1. The evaluation results are shown in Tables 3 to 9.

Comparative Example 1

A polyamide based mixed resin film roll in Comparative example 1 was obtained in the same manner as in Example 2 except that material used was chip A only. Then, the characteristics of the obtained film were evaluated by the method same as that of Example 1. The evaluation results are shown in Tables 3 to 9.

Comparative Example 2

A polyamide based mixed resin film roll in Comparative example 2 was obtained in the same manner as in Example 2 except that the mixing ratio (weight ratio) of the two was changed to 95:5 and at the same time pre-drying conditions of material chips A and B were changed to a method to heat at about 100° C. for about 4.0 hours. Additionally, when a predetermined amount of each chip was collected from a blender after pre-draying and the water content was measured, the water contents of chips A and B were both 1500 ppm, and the temperatures of chips A and B just before they were fed into a hopper were both about 85° C. And the characteristics of the obtained film roll were evaluated by the method same as that of Example 1. The evaluation results are shown in Tables 3 to 9.

Comparative Example 3

A polyamide based mixed resin film roll in Comparative example 3 was obtained in the same manner as in Example 2 except that material chips A and B were let to stand for about 5 hours in each blender before supplying to a hopper just above an extruder after pre-drying. Additionally, the water contents of chips A and B just before they were supplied to the hopper were both 800 ppm, and the temperatures of chips A and B just before they were fed into the hopper were both about 30° C. Then, the characteristics of the obtained film roll were evaluated by the method same as that of Example 1. The evaluation results are shown in Tables 3 to 9.

Comparative Example 4

A polyamide based mixed resin film roll in Comparative example 4 was obtained in the same manner as in Example 2 except that the tilting angle of the hopper was changed to 45° when material chips A and B in the blenders were supplied to the hopper just above the extruder. Then, the characteristics of the obtained film were evaluated by the method same as that of Example 1. The evaluation results are shown in Tables 3 to 9.

Comparative Example 5

A polyamide based mixed resin film roll in Comparative example 5 was obtained in the same manner as in Example 2 except that no segregation inhibitor was added in the hopper when material chips A and B in the blenders were supplied to the hopper just above the extruder. Then, the characteristics of the obtained film were evaluated by the method same as that of Example 1. The evaluation results are shown in Tables 3 to 9.

Comparative Example 6

A polyamide based mixed resin film roll in Comparative example 6 was obtained in the same manner as in Example 2 except that material chip A and material chip H were used and the mixing ratio (weight ratio) of the two was changed to 95:5. Additionally, in Comparative example 6, the average major axis and average chip length of elastomer chip (chip H) were not included within a range of ±20%, respectively, with respect to the average major axis and average chip length of polyamide based resin chip (chip A). Then, the characteristics of the obtained film were evaluated by the method same as that of Example 1. The evaluation results are shown in Tables 3 to 9.

TABLE 3

Characteristics of polyamide based mixed resin film roll

| | Average content of elastomer (%) | Max./Min. of elastomer content in all samples (%) | Degree of variability* of content to average content (%) |
|---|---|---|---|
| Example 1 | 3 | 2.9 | 3.3 |
| Example 2 | 3 | 2.9 | 3.3 |
| Example 3 | 10 | 9.5 | 5.0 |
| Example 4 | 5 | 5.2 | 4.0 |
| Example 5 | 5 | 4.6 | 8.0 |
| Example 6 | 5 | 4.6 | 8.0 |
| Example 7 | 5 | 5.3 | 6.0 |
| Example 8 | 5 | 5.4 | 8.0 |
| Comparative example 1 | — | — | — |
| Comparative example 2 | 5 | 5.4 | 8.0 |
| Comparative example 3 | 5 | 4.5 | 10.0 |
| Comparative example 4 | 5 | 4.1 | 18.0 |
| Comparative example 5 | 5 | 3.5 | 30.0 |
| Comparative example 6 | 5 | 2.9 | 42.0 |

*Degree of variability of content to average content: The degree of variability was computed by the use of a difference between the maximum or the minimum elastomer content of all samples and the average content, whichever larger.

TABLE 4

Characteristics of polyamide based mixed resin film roll

| | Average thickness (μm) | Max./Min. of thickness throughout the full length (μm) | Degree of variability* of thickness to average thickness (%) |
|---|---|---|---|
| Example 1 | 15.05 | 15.80 | 5.0 |
| Example 2 | 15.03 | 14.28 | 5.0 |

TABLE 4-continued

Characteristics of polyamide based mixed resin film roll

|  | Average thickness (μm) | Max./Min. of thickness throughout the full length (μm) | Degree of variability* of thickness to average thickness (%) |
|---|---|---|---|
| Example 3 | 15.03 | 14.13 | 6.0 |
| Example 4 | 14.96 | 15.49 | 3.5 |
| Example 5 | 15.01 | 15.92 | 6.1 |
| Example 6 | 15.03 | 14.01 | 6.8 |
| Example 7 | 15.02 | 16.10 | 7.2 |
| Example 8 | 15.03 | 14.35 | 4.5 |
| Comparative example 1 | 15.03 | 16.07 | 6.9 |
| Comparative example 2 | 14.89 | 13.03 | 12.5 |
| Comparative example 3 | 14.97 | 12.65 | 15.5 |
| Comparative example 4 | 15.05 | 16.81 | 11.7 |
| Comparative example 5 | 14.99 | 12.88 | 14.1 |
| Comparative example 6 | 15.03 | 12.96 | 13.8 |

*Degree of variability of thickness to average thickness: The degree of variability was computed by the use of a difference between the maximum or the minimum thickness throughout the full length and the average length, whichever larger.

TABLE 5

Characteristics of polyamide based mixed resin film roll

|  | Average elastic modulus in tension (GPa) | Max./Min. of elastic modulus in tension of all samples (GPa) | Degree of variability* of elastic modulus in tension to average elastic modulus in tension (%) |
|---|---|---|---|
| Example 1 | 1.90 | 2.05 | 7.9 |
| Example 2 | 1.95 | 2.10 | 7.7 |
| Example 3 | 1.55 | 1.65 | 6.5 |
| Example 4 | 2.10 | 2.00 | 4.8 |
| Example 5 | 1.75 | 1.60 | 8.6 |
| Example 6 | 1.75 | 1.60 | 8.6 |
| Example 7 | 2.10 | 1.95 | 7.1 |
| Example 8 | 1.65 | 1.75 | 6.1 |
| Comparative example 1 | 2.30 | 2.20 | 4.3 |
| Comparative example 2 | 1.80 | 1.70 | 5.6 |
| Comparative example 3 | 1.80 | 1.65 | 8.3 |
| Comparative example 4 | 1.75 | 1.55 | 11.4 |
| Comparative example 5 | 1.75 | 1.50 | 14.3 |
| Comparative example 6 | 1.70 | 1.95 | 14.7 |

*Degree of variability of elastic modulus in tension to average elastic modulus in tension: The degree of variability was computed by the use of a difference between the maximum or the minimum elastic modulus in tension of all samples and the average elastic modulus in tension, whichever larger.

TABLE 6

Characteristics of polyamide based mixed resin film roll

|  | Average boiling water shrinkage percentage (BSax: %) | Maximum or minimum of maximum boiling water shrinkage percentage of all samples (%) | Degree of variability in maximum boiling water shrinkage percentage to average boiling water shrinkage percentage* (%) |
|---|---|---|---|
| Example 1 | 3.9 | 4.1 | 5.1 |
| Example 2 | 4.1 | 3.9 | 4.9 |
| Example 3 | 3.5 | 3.8 | 8.6 |
| Example 4 | 3.9 | 3.8 | 2.6 |
| Example 5 | 4.5 | 4.7 | 4.4 |
| Example 6 | 4.8 | 5.1 | 6.3 |
| Example 7 | 4.3 | 4.7 | 9.3 |
| Example 8 | 4.5 | 4.9 | 8.9 |
| Comparative example 1 | 4.2 | 4.5 | 7.1 |
| Comparative example 2 | 4.2 | 4.8 | 14.3 |
| Comparative example 3 | 5.6 | 6.4 | 14.3 |
| Comparative example 4 | 4.9 | 5.4 | 10.2 |
| Comparative example 5 | 5.5 | 4.9 | 10.9 |
| Comparative example 6 | 5.1 | 5.8 | 13.7 |

*Degree of variability of maximum boiling water shrinkage percentage to average boiling water shrinkage percentage: The degree of variability was computed by the use of a difference between the maximum or the minimum boiling water shrinkage percentage of all samples and the average boiling water shrinkage percentage, whichever larger.

TABLE 7

Characteristics of polyamide based mixed resin film roll

|  | Average directional difference of boiling water shrinkage percentage (BSad: %) | Maximum or minimum of directional difference of water shrinkage percentage of all samples (%) | Degree of variability in directional difference of boiling water shrinkage percentage to average directional difference of boiling water shrinkage percentage* (%) |
|---|---|---|---|
| Example 1 | 1.4 | 1.5 | 7.1 |
| Example 2 | 1.0 | 1.1 | 10.0 |
| Example 3 | 1.4 | 1.3 | 7.1 |
| Example 4 | 1.0 | 1.1 | 10.0 |
| Example 5 | 1.1 | 1.0 | 9.1 |
| Example 6 | 1.3 | 1.2 | 7.7 |
| Example 7 | 1.4 | 1.3 | 7.1 |
| Example 8 | 1.2 | 1.1 | 8.3 |
| Comparative example 1 | 1.4 | 1.3 | 7.1 |
| Comparative example 2 | 1.6 | 1.8 | 12.5 |
| Comparative example 3 | 1.5 | 1.7 | 13.3 |
| Comparative example 4 | 1.8 | 1.5 | 16.7 |
| Comparative example 5 | 1.8 | 2.1 | 16.7 |
| Comparative example 6 | 2.1 | 2.5 | 19.0 |

*Degree of variability of directional difference of boiling water shrinkage percentage to average directional difference of boiling water shrinkage: The degree of variability was computed by the use of a difference between the maximum or the minimum directional difference of boiling water shrinkage percentage of all samples and the average directional difference of boiling water shrinkage percentage, whichever larger.

TABLE 8

Characteristics of polyamide based mixed resin film roll

| | Average refraction (Nz) | Maximum or minimum of refraction indexes of all samples | Degree of variability in refraction index to average refraction index* (%) |
|---|---|---|---|
| Example 1 | 1.507 | 1.515 | 0.5 |
| Example 2 | 1.508 | 1.519 | 0.7 |
| Example 3 | 1.514 | 1.508 | 0.4 |
| Example 4 | 1.510 | 1.517 | 0.5 |
| Example 5 | 1.510 | 1.519 | 0.6 |
| Example 6 | 1.512 | 1.507 | 0.3 |
| Example 7 | 1.510 | 1.516 | 0.4 |
| Example 8 | 1.505 | 1.510 | 0.3 |
| Comparative example 1 | 1.510 | 1.506 | 0.3 |
| Comparative example 2 | 1.508 | 1.524 | 1.1 |
| Comparative example 3 | 1.512 | 1.502 | 0.7 |
| Comparative example 4 | 1.507 | 1.522 | 1.0 |
| Comparative example 5 | 1.502 | 1.514 | 0.8 |
| Comparative example 6 | 1.502 | 1.518 | 1.1 |

*Degree of variability of refraction index to average refraction index: The degree of variability was computed by the use of a difference between the maximum or the minimum refraction index of all samples and the average refraction index, whichever larger.

and refraction index undergo no S-shaped curl phenomenon and have an excellent lamination processability. Moreover, it is known that the films composing film rolls of Examples 1 to 8 provide superb impact strength (toughness and pinhole resistance) and high in laminate strength. Furthermore, it is known that because the film provides outstandingly satisfactory pinhole resistance and small variations, it is suited for packaging applications of foods containing a large amount of water such as liquid soup, etc.

In contrast, it is known that film rolls of Comparative examples 1 to 6 have a large thickness irregularity over the entire roll in the longitudinal direction a large variation of content of elastomer and a large variation of physical properties such as variability of elastic modulus, boiling water shrinkage percentage and refraction index, develop an S-shaped curl phenomenon, and achieve poor lamination processability. Furthermore, it is known that because the film rolls of Comparative examples 1 through 6 provide poor pinhole resistance and large variations, they are not suited for packaging applications of foods containing a large amount of water such as liquid soup, etc.

INDUSTRIAL APPLICABILITY

A polyamide based mixed resin film roll of the present invention can be preferably used in an application of retort processing for food since it has excellent processability as described above and remarkably good pinhole resistance and moreover small variations.

TABLE 9

Evaluation result

| | S-shaped curve | | Impact strength (kg/cm) | | Laminate strength (g/15 mm) | | | Pinhole resistance (piece/497 cm2) | |
|---|---|---|---|---|---|---|---|---|---|
| | Total | Sample numbers each of ⊚, X, ○ | Average | Variation range | Average | Variation range | Lamination processability | Average | Min.-Max. |
| Example 1 | ⊚ | ⊚ ... 18, ○ ... 3 | 13.8 | 12.8-14.1 | 200 | 190-210 | ○ | 3 | 0-5 |
| Example 2 | ⊚ | ⊚ ... 19, ○ ... 2 | 13.4 | 12.7-13.8 | 200 | 190-210 | ○ | 3 | 0-5 |
| Example 3 | ⊚ | ⊚ ... 18, ○ ... 3 | 12.3 | 12.0-12.7 | 170 | 150-180 | ○ | 0 | 0 |
| Example 4 | ⊚ | ⊚ ... 21 | 12.5 | 12.1-13.1 | 230 | 230-250 | ○ | 5 | 3-7 |
| Example 5 | ⊚ | ⊚ ... 19, ○ ... 2 | 13.8 | 12.6-14.3 | 190 | 180-200 | ○ | 3 | 0-5 |
| Example 6 | ⊚ | ⊚ ... 18, ○ ... 3 | 13.6 | 13.0-14.1 | 170 | 150-180 | ○ | 2 | 1-4 |
| Example 7 | ⊚ | ⊚ ... 16, ○ ... 5 | 12.2 | 11.5-12.4 | 250 | 220-250 | ○ | 5 | 3-7 |
| Example 8 | ⊚ | ⊚ ... 16, ○ ... 5 | 13.5 | 13.0-14.0 | 180 | 180-200 | ○ | 5 | 3-7 |
| Comparative example 1 | ⊚ | ⊚ ... 16, ○ ... 5 | 12.1 | 11.4-12.6 | 240 | 230-250 | ○ | 30 | 20-40 |
| Comparative example 2 | X | ⊚ ... 2, ○ ... 7, X ... 12 | 13.1 | 10.6-13.8 | 190 | 170-210 | Δ | 7 | 2-12 |
| Comparative example 3 | X | ⊚ ... 2, ○ ... 7, X ... 12 | 13.5 | 11.2-14.3 | 200 | 190-220 | Δ | 7 | 2-13 |
| Comparative example 4 | ○-X | ○ ... 9, X ... 12 | 12.4 | 11.1-13.0 | 160 | 130-180 | Δ | 7 | 2-12 |
| Comparative example 5 | ○-X | ○ ... 9, X ... 12 | 12.2 | 10.8-13.2 | 150 | 130-170 | Δ | 9 | 2-16 |
| Comparative example 6 | X | ○ ... 5, X ... 16 | 12.3 | 10.6-13.0 | 150 | 120-170 | X | 12 | 0-25 |

Effect of Film in Examples

It is known from Tables 3 to 9 that all the film rolls of Examples 1 to 8 have a very small thickness irregularity over the entire roll in the longitudinal direction, and a small variation of elastomer content as well as physical properties such as elastic modulus in tension, boiling water shrinkage percentage and refraction index. Also, it is known that all such film rolls of Examples 1 to 8 having a small variation of elastomer content as well as physical properties such as variability of elastic modulus, boiling water shrinkage percentage

The invention claimed is:

1. A film roll wound up of a polyamide based mixed resin film composed of a mixed resin consisting of polyamide based resin and thermoplastic elastomer in a width of 0.2 m or more, 3.0 m or less, and a length of 300 m or more, 30000 m or less, wherein when a first sample cutout portion is set up within 2 m from the winding end of film and a final cutout portion is set up within 2 m from the winding start of film, and wherein when a sample cutout portion is set up in approximately every 100 m from the first sample cutout portion, the following requirements (1) and (2) are satisfied:
(1) when the content of thermoplastic elastomer constituent is measured for each sample cut out from each of the cutout portions, and the average content rate which is the average value of these content rates is computed, the degree of variability of the content of thermoplastic elastomer constituent of all the samples is within the ±10% range with respect to the average content rate, and
(2) the degree of variability of thickness throughout the full length in the longitudinal direction of a wound-up roll is within the range of ±2% to ±10% with respect to the average thickness;
wherein the thermoplastic elastomer of the polyamide based mixed resin film wound up is selected from polyamide based elastomers of block or random copolymers of polyamide based resin and polytetramethylene glycol or polyethylene glycol; and
wherein the amount of the thermoplastic elastomer of the polyamide based mixed resin film wound up is 1% by weight or more and 6% by weight or less.

2. The polyamide based mixed resin film roll according to claim 1, wherein when the elastic modulus in tension in the film winding-up direction is measured for each sample cut out from each of the cutout portions, the average elastic modulus in tension which is the average value of elastic moduli of the samples, is 1.30 GPa or more and less than 2.50 GPa and at the same time the degrees of variability of all samples are included in the range of ±10% with respect to the average elastic modulus in tension.

3. The polyamide based mixed resin film roll according to claim 1, wherein the number of pinholes when a 3000-cycle bending test is continuously carried out on each sample cut out from each cutout portion at the speed of 40 cycles per minute using a Gelvo type Flex-Cracking Tester is 10 or less in all cases.

4. The polyamide based mixed resin film roll according to claim 1, the roll wherein when a maximum boiling water shrinkage percentage of each sample cut out from each of the cutout portions is measured, the maximum boiling water shrinkage percentage being the maximum value of boiling water shrinkage percentages in all directions, an average boiling water shrinkage percentage which is average of the maximum boiling water shrinkage percentages is 3% to 6%, and a degree of variability in the maximum boiling water shrinkage percentages of all samples is within ±2% to ±10% relative to the average boiling water shrinkage percentage.

5. The polyamide based mixed resin film roll according to claim 1, the roll wherein when a directional difference of boiling water shrinkage percentage of each sample cut out from each of the cutout portions is measured, the directional difference of boiling water shrinkage percentage being the difference between a boiling water shrinkage percentage in the direction of +45° to the longitudinal direction and a boiling water shrinkage percentage in the direction of −45° to the longitudinal direction in an absolute value, an average directional difference of boiling water shrinkage percentage which is the average of the directional differences of boiling water shrinkage percentage is 1.5% or less, and a degree of variability in the directional differences of boiling water shrinkage percentage of all samples is within ±2% to ±10% relative to the average directional difference of boiling water shrinkage percentage.

6. The polyamide based mixed resin film roll according to claim 1, the roll wherein when refraction index in the thick direction of each sample cut out from each of the cutout portions is measured, an average refraction index which is the average of the refraction indexes is 1.500 or more, 1.520 or less, and a degree of variability in the refraction indexes of all samples is within ±2% relative to the average refraction index.

7. The polyamide based mixed resin film roll according to claim 1, the roll wherein the major component of polyamide composing the polyamide based mixed resin film is nylon 6.

8. The polyamide based mixed resin film roll according to claim 1, the roll wherein the major component of thermoplastic elastomer composing the polyamide based mixed resin film is at least one kind of polyamide-based elastomer and polyolefin-based elastomer.

9. The polyamide based mixed resin film roll according to claim 1, the roll wherein the polyamide based mixed resin film wound up is laminated with a polyolefin based resin film.

10. The polyamide based mixed resin film roll according to claim 1, the roll which is a polyamide based mixed resin film wound up wherein an unoriented sheet-like material obtained by extruding molten polyamide based resin from a T-die and cooling by contact with a metal roll is biaxially stretched.

11. The polyamide based mixed resin film roll according to claim 1, the roll which is a polyamide based mixed resin film wound up being stretched by a tenter stretching method.

12. The polyamide based mixed resin film roll according to claim 1, the roll which is a polyamide based mixed resin film wound up being sequentially biaxially stretched.

13. The polyamide based mixed resin film roll according to claim 1, the roll which is a polyamide based mixed resin film wound up being biaxially stretched in the longitudinal direction and the transverse direction.

14. The polyamide based mixed resin film roll according to claim 1, the roll which is a polyamide based mixed resin film wound up wherein an essentially unoriented sheet-like material of polyamide based resin is stretched in at least two stages in the longitudinal direction in threefold or more at a higher temperature than the glass transition temperature of the main component of the polyamide based resin plus 20° C., then stretched in the transverse direction in threefold or more.

15. The polyamide based mixed resin film roll according to claim 1, the roll which is a polyamide based mixed resin film wound up being thermally fixed after a final stretching treatment.

16. The polyamide based mixed resin film roll according to claim 1, the roll which is a polyamide based mixed resin film wound up being relaxed after thermal fixation.

17. The polyamide based mixed resin film roll according to claim 1, the roll wherein at least one kind selected from the group consisting of lubricant, anti-blocking agent, thermal stabilizer, antioxidant, antistatic agent, light resistant agent and impact modifier is added to the polyamide based mixed resin film wound up.

18. The polyamide based mixed resin film roll according to claim 1, the roll wherein inorganic particle is added to the polyamide based mixed resin film wound up.

19. The polyamide based mixed resin film roll according to claim 1, the roll wherein the inorganic particle is a silica particle of 0.5-5.0 μm in an average diameter.

20. The polyamide based mixed resin film roll according to claim 1, the roll wherein a higher fatty acid is added to the polyamide based mixed resin film wound up.

21. A production method of polyamide based mixed resin film roll according to claim 1, comprising: a step of film forming while melt-extruding polyamide based resin chip and thermoplastic elastomer chip; a step of biaxial stretching wherein an unstretched film obtained in the step of film forming is stretched biaxially in the longitudinal direction and the transverse direction; and a step of roll forming by winding up the biaxially stretched film, and satisfies the following requirements (1) and (2).

1) The step of film forming includes melt extrusion after polyamide based resin chip and thermoplastic elastomer chip are mixed, wherein the shape of each resin chip used is elliptic cylinder having elliptic cross section with a major axis and a minor axis, and the thermoplastic elastomer chip is adjusted each in its average major axis, average minor axis and average chip length so as to be within a range of ±20% relative to the average major axis, average minor axis and average chip length of the polyamide based resin chip.

2) The step of film forming includes melt extrusion after polyamide based resin chip and thermoplastic elastomer chip are mixed, wherein mixing of the polyamide based resin chip and thermoplastic elastomer chip is performed with a sublimation segregation inhibitor.

22. The production method of polyamide based mixed resin film roll according to claim 21 wherein the step of biaxial stretching includes a stretching in the transverse direction after a stretching in the longitudinal direction in two stages and the stretching ratio in the first stage of two-stage stretching in the longitudinal direction in the step of biaxial stretching is higher than the stretching ratio in the second stage.

23. The production method of polyamide based mixed resin film roll according to claim 21, further comprising a step of melt extrusion using an extruder equipped with a funnel-shaped hopper as a feed section of material chip, wherein an angle of slope of the hopper is adjusted to 65° or more, a water content of polyamide based resin chip and thermoplastic elastomer chip before being fed to the hopper is adjusted to 800 ppm or more, and 1000 ppm or less, and furthermore a temperature of polyamide based resin chip and thermoplastic elastomer before being fed to the hopper is adjusted to 80° C. or more.

24. The production method of polyamide based mixed resin film roll according to claim 21, further comprising a step of preheating conducted before a step of longitudinal stretching and a step of thermal treatment conducted after the step of longitudinal stretching in the step of biaxial stretching, wherein a variation width of surface temperature of film at any point of the step of longitudinal stretching,
the step of preheating and the step of thermal treatment and the step of longitudinal stretching is adjusted over the entire film length within a range of ±1° C. to the average temperature.

25. The production method of polyamide based mixed resin film roll according to claim 21, wherein the step of film forming includes a roll cooling step of winding up melted resin extruded from an extruder on a cooling roll, wherein a part contacting the melted resin with the surface of cooling roll is sucked over the entire width of melted resin by a suction unit in the opposite direction to the winding up direction.

* * * * *